US011923134B2

(12) United States Patent
Ji

(10) Patent No.: US 11,923,134 B2
(45) Date of Patent: Mar. 5, 2024

(54) MAGNET ALTERNATING POLE ARRAY MAGNETIZED BY ONE SIDE MAGNETIZATION TO BOOST MAGNETIC ATTRACTION FORCE

(71) Applicant: Apple Inc., Cupertino, CA (US)

(72) Inventor: Qigen Ji, Fairfield, CA (US)

(73) Assignee: APPLE INC., Cupertino, CA (US)

( * ) Notice: Subject to any disclaimer, the term of this patent is extended or adjusted under 35 U.S.C. 154(b) by 979 days.

(21) Appl. No.: 16/564,258

(22) Filed: Sep. 9, 2019

(65) Prior Publication Data

US 2021/0074459 A1 Mar. 11, 2021

(51) Int. Cl.

| | |
|---|---|
| ***H01F 7/02*** | (2006.01) |
| ***B25B 11/00*** | (2006.01) |
| ***G11B 5/65*** | (2006.01) |
| ***H01F 7/04*** | (2006.01) |

(52) U.S. Cl.

CPC .......... *H01F 7/0273* (2013.01); *B25B 11/002* (2013.01); *G11B 5/656* (2013.01); *H01F 7/0252* (2013.01); *H01F 7/04* (2013.01)

(58) Field of Classification Search

CPC ..................................................... H01F 7/0252

See application file for complete search history.

(56) References Cited

U.S. PATENT DOCUMENTS

| | | | | |
|---|---|---|---|---|
| 4,941,236 | A * | 7/1990 | Sherman .............. | A44C 5/2071 24/303 |
| 5,416,457 | A * | 5/1995 | Nakatsuka .............. | H01F 7/021 335/302 |
| 6,304,162 | B1 * | 10/2001 | Nakatsuka ............ | H01F 41/028 335/302 |
| 8,390,412 | B2 | 3/2013 | Lauder et al. | |
| 8,816,805 | B2 | 8/2014 | Fullerton et al. | |
| 10,117,504 | B2 | 11/2018 | Bataillou et al. | |
| 2014/0028426 | A1 * | 1/2014 | Fullerton .................. | H01F 7/02 335/306 |
| 2018/0350491 | A1 | 12/2018 | Bharadwaj et al. | |
| 2019/0269914 | A1 * | 9/2019 | Moaddeb ............. | A61B 8/4227 |

FOREIGN PATENT DOCUMENTS

| | | | | |
|---|---|---|---|---|
| JP | 2010032303 A * | 2/2010 | .............. | F16C 33/78 |

* cited by examiner

*Primary Examiner* — Ramon M Barrera
(74) *Attorney, Agent, or Firm* — Dorsey & Whitney LLP

(57) ABSTRACT

A flexible magnetic component can include a magnetizable powder including a rare earth element. The flexible magnetic component can also include a polymer binder. The flexible magnetic component can define a first surface and a second surface opposite the first surface. A first magnetic field adjacent to the first surface can have a field strength at least 3 times greater than a field strength of a second magnetic field adjacent to the second surface, and the flexible magnetic component can elongate greater than 20% before a permanent deformation occurs.

20 Claims, 13 Drawing Sheets

MAGNET ALTERNATING POLE ARRAY MAGNETIZED BY ONE SIDE MAGNETIZATION TO BOOST MAGNETIC ATTRACTION FORCE

FIELD

The present disclosure relates generally to magnetic components. More particularly, the present disclosure relates to flexible magnetic components.

BACKGROUND

Magnetic components have an increasing variety of uses, for example, as closures or securing components for accessories, electronic devices, wearable devices, and other products. Magnets can also be used in electronic devices, such as in wearable devices or handheld electronics, to activate various sensors and to provide an indication of a device's configuration or state of change. In order to perform these desired functions, it can be important for a magnetic component to have a high level of magnetic field strength and/or to exert a strong magnetic attractive force. Further, it can be desirable for the magnetic components of a device, especially a flexible or wearable device, to be thin and flexible so that the presence of the magnetic component is not obvious or distracting to the user.

Traditional magnetic materials and component designs could only achieve these desired levels of performance with undesirably heavy, large, or rigid magnets. These traditional components and materials are typically subject to undesirable demagnetization over time. Accordingly, there is a need for magnetic materials and components that can achieve desired levels of performance, while also being relatively thin, flexible, lightweight, and not prone to demagnetization.

SUMMARY

According to some aspects of the present disclosure, a flexible magnetic component can include a magnetizable powder including a rare earth element, and a polymer binder. The flexible magnetic component can have a first magnetic field strength adjacent to a first surface of the flexible magnetic component at least 3 times greater than a second magnetic field strength adjacent to a second surface of the flexible magnetic component opposite the first surface. The flexible magnetic component can also elongate greater than 20% before a permanent deformation occurs. In other words, the flexible magnetic component can elongate greater than 20% without plastic deformation.

In some examples, the flexible magnetic component can include between 25 volume percent (vol %) and 45 vol % of the polymer binder. The polymer binder can include at least one of a nitrile butadiene rubber material, a silicone material, or a fluoroelastomer material. The magnetizable powder can include neodymium. The flexible magnetic component can have a density of between 5 grams per cubic centimeter (g/cm3) and 6.5 g/cm3. The flexible magnetic component can include a first portion having a first magnetic polarity, and two second portions disposed adjacent to the first portion and having magnetic polarities that are opposite the first magnetic polarity. The magnetic flux from a first magnetic pole of the first portion to a magnetic pole of a second adjacent portion having an opposite polarity can pass entirely through the flexible magnetic component, and magnetic flux from a second magnetic pole of the first portion to a magnetic pole of the second adjacent portion having an opposite polarity can pass through an exterior surface defined by the first portion and an exterior surface defined by the second portion.

According to some aspects, a flexible magnetic component can have a body defining a first surface and a second surface opposite the first surface. A first magnetic field strength adjacent to the first surface can be at least 3 times greater than a second magnetic field strength adjacent to the second surface, and the body can experience no permanent deformation upon being elongated more than 20%.

In some examples, the flexible magnetic component can include a first portion having a first magnetic polarity, a second portion surrounding the first portion having a magnetic polarity opposite the first magnetic polarity, and a third portion surrounding the second portion having the first magnetic polarity. The flexible magnetic component can have a thickness of less than 0.3 millimeters. The flexible magnetic component can be isotropically magnetized. The flexible magnetic component can be isotropically magnetized in two spatial dimensions, and anisotropically magnetized in a third spatial dimension. The body of the flexible magnetic component can include between 55 vol % and 75 vol % of a magnetizable powder. A hybrid magnetic component can include the flexible magnetic component and a sintered magnetic material disposed adjacent to the flexible magnetic component.

According to some examples, a securing system for a device can include a device enclosure including a magnetic material and a component including a flexible magnetic portion that is attracted to the magnetic material of the device enclosure. The flexible magnetic portion can define a first surface and a second surface opposite the first surface and a first magnetic field strength adjacent to the first surface can be at least 3 times greater than a second magnetic field strength adjacent to the second surface. The flexible magnetic portion can also elongate greater than 20% before a permanent or plastic deformation occurs.

In some examples, the flexible magnetic portion can include a magnetizable powder including a rare earth element, and a polymer binder. The magnetic material can include a sintered magnet. The device enclosure can include a watch housing and the component can include a watch band. The flexible magnetic portion can be a first flexible magnetic portion, and the component can include a second flexible magnetic portion having a magnetic polarity opposite the first flexible magnetic portion. The device enclosure can include an electronic device enclosure including a transparent portion overlying a display, and the flexible magnetic component can include a cover for transparent portion.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
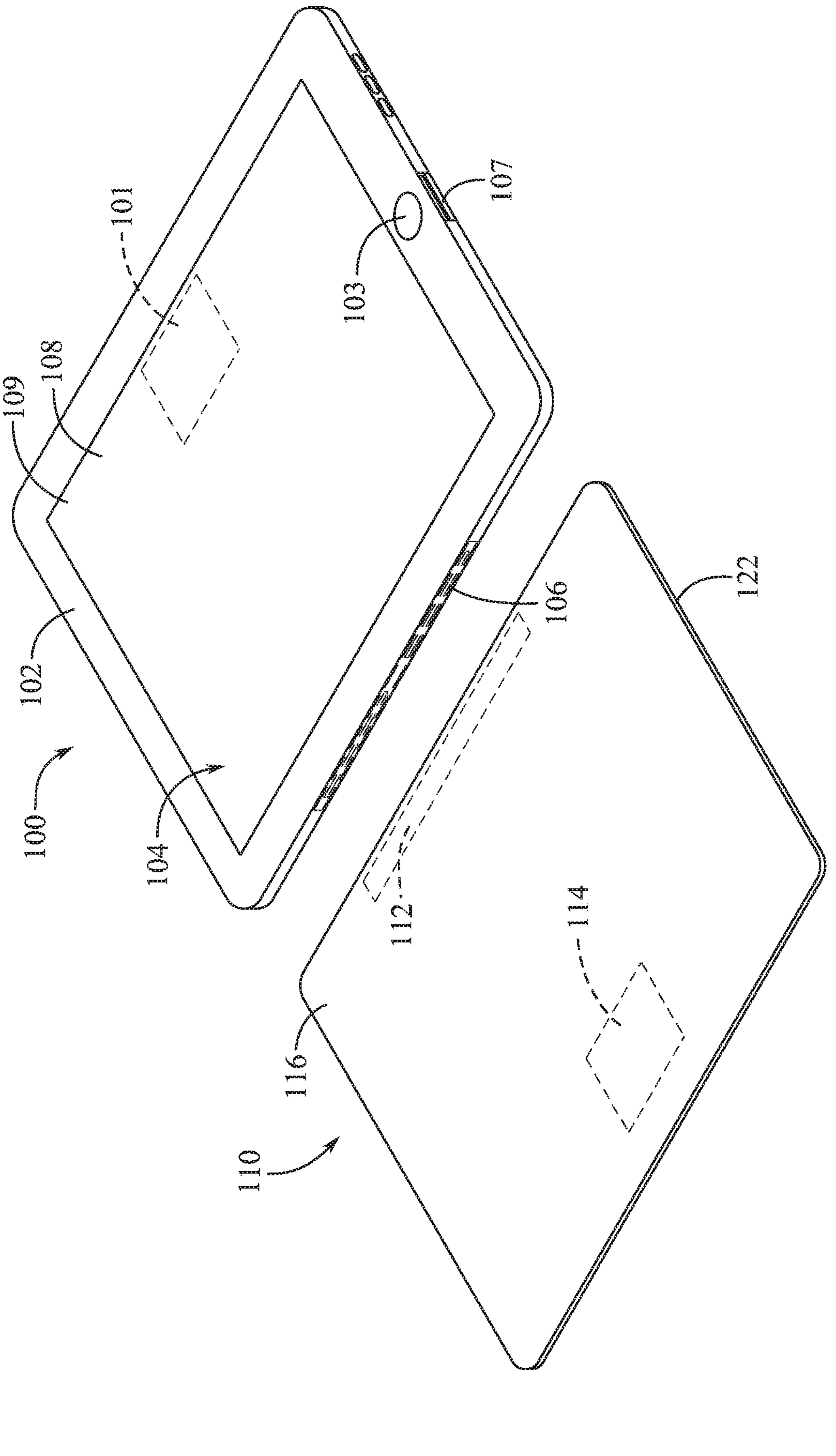
FIG. 1 shows a perspective view of an electronic device and a cover.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents, as can be included within the spirit and scope of the described embodiments, as defined by the appended claims.

A securing system for a wearable electronic device can include a device enclosure including a magnetic material located at one or more desired locations. The securing system can further include a securing component that can include a flexible magnetic portion or component that exerts an attractive force on the magnetic material of the device enclosure. This attractive force can aid in removably fixing the securing component to the device enclosure. The flexible magnetic portion can include a magnetizable powder that includes a rare earth element, with the magnetizable powder encased or embedded in a flexible polymeric binder material. The flexible magnetic portion can have multiple sections of alternating magnetic polarities, and the flux of the magnetic fields generated by these sections can pass entirely or predominantly through a single surface of the flexible magnetic portion. The flexible magnetic portion can have an attractive magnetic force per volume of greater than 25 $N/cm^3$ when disposed directly adjacent to an identical flexible magnetic portion of opposite magnetic polarity. The flexible magnetic portion can also elongate by greater than 20% before a permanent or plastic deformation occurs.

Magnets and magnetic components can be used in electronic devices, electronic device accessories, and other components of electronic devices to enable a wide variety of functions and capabilities. In the context of wearable devices, magnets can be incorporated into securing components to allow a user to securely, yet removably, secure the device to the user's body, for example, with a magnetic clasp or other securement mechanism. Magnets and magnetic components can also be used in other contexts, for example, to attach or retain accessories such as input components or covers to an electronic device. In addition to providing secure yet removable securement components that do not include complex mechanical parts, which can be expensive or prone to damage, magnetic components can also be used to interact with sensors of a device to communicate information, such as whether a cover has been attached thereto, and to allow a device to respond accordingly, such as by turning off a display.

An additional advantage of using magnetic components to achieve desired functionalities is that magnetic components can be incorporated into a component or a device to perform a desired function without the need to be exposed to the ambient environment. Magnetic components can be incorporated into other device components in a relatively unobtrusive manner. In some examples, it can be desirable to incorporate a magnetic component such that its presence will not be noticeable to a user outside of the functions it performs. Accordingly, it can be desirable for a magnetic component to be as small and as light as possible, so as to reduce its footprint or noticeability to a user when incorporated into a device or a component.

This desire can present challenges in certain contexts, such as in the context of flexible components for wearable devices. In the example of a strap, such as a wristband for a wearable device, it can be desirable to provide a strap that is lightweight and flexible to secure the wearable device to the user. These properties can be advantageous for user comfort, and can also mimic the flexibility and sleekness of straps that are traditionally used on conventional wristwatches. This combination can provide the user with a desired aesthetic and tactile experience.

Conventional magnetic components, however, can be too brittle, too rigid, too heavy, and/or too large to be incorporated into such a flexible component. For example, conventional magnetic components, such as sintered magnets, can provide a desired level of magnetic field strength, but can be too heavy and too brittle to be incorporated into a flexible component. The use of sintered magnetic components in a watch band, for example, can result in large inflexible portions where the magnetic components are incorporated, making them obvious to the user and providing obstacles to user comfort. Other conventional magnetic components, such as bonded magnets, can come close to achieving desired levels of deformability or flexibility, but typically produce a magnetic field that is too weak to enable desired levels of performance. For example, a bonded magnet including a conventional magnetic powder and a polymer binder that is magnetized by a conventional magnetization process can be flexible and deformable, but will need to be relatively thick and large, or require the use of a metallic shunt, in order to produce a high magnetic field strength, thereby obviating any benefits provided by the potential flexibility of the material.

In contrast, the magnetic components described herein can provide desired levels of flexibility, deformability, size, weight, and other material properties, while also providing high strength magnetic fields that can produce much stronger attractive forces than conventional magnets having the same or similar material properties. The materials, design, and/or magnetization processes used to form the magnetic components described herein can allow for extremely thin and flexible magnetic components that produce magnetic fields of very high strength. The properties of the magnetic components described herein can allow for the production of flexible components, such as components for wearable devices, that are lightweight and flexible, and that do not include undesirably rigid or thick portions, while still incorporating magnetic components. Accordingly, the magnetic components described herein can be incorporated into a variety of components and devices in an unobtrusive and comfortable manner, and can even allow for component and device designs, performance, and functionalities that are unachievable with conventional magnetic components.

These and other examples are discussed below with reference to FIGS. 1-13. However, those skilled in the art will readily appreciate that the detailed description given herein with respect to these Figures is for explanatory purposes only and should not be construed as limiting.

FIG. 1 shows an example of an electronic device 100 and a cover 110. The electronic device shown in FIG. 1 is a tablet computer or a tablet device. The tablet computer 100 of FIG. 1 is merely one representative example of a device that can be used in conjunction with the components and methods disclosed herein. The electronic device 100 can correspond to any form of electronic device, wearable electronic device, portable media player, media storage device, portable digital assistant ("PDA"), tablet computer, computer, mobile communication device, GPS unit, remote control device, or other electronic device. The electronic device 100 can be referred to as an electronic device, or a consumer device.

In particular, FIG. 1 illustrates a perspective view of the tablet device 100 and cover assembly 110 in an open configuration, and separated from one another. The tablet device 100 can include a housing 102 that can enclose and support a device attachment feature 106. As described herein, the attachment feature 106 can cooperate with a magnetic component 112 of the cover 110 to secure the cover 110 to the device 100. In some examples, the attachment feature 106 can include a magnetic material, such as a sintered magnet and can generate a magnetic field. In some examples, in order not to interfere with the magnetic field generated by device attachment feature 106, at least that portion of the housing 102 surrounding the attachment feature 106 can be formed of any number of non-magnetic materials, such as plastic or a non-magnetic metal such as aluminum.

In some examples, the housing 102 can also enclose and support various structural and electrical components, including integrated circuit chips and other circuitry, to provide computing operations for the tablet device 100. In some examples, the housing 102 can define an aperture 104 that can be sized to accommodate a display assembly 108 or any other system suitable for providing a user with visual content. In some examples, the display assembly 108 can be a touch sensitive display and can include touch sensitive capabilities to allow the user to manipulate the device 100 using touch inputs. The display assembly 108 can be formed of any number of layers, including a transparent cover 109 that can be disposed over a display component and can include transparent materials, such as transparent polymers or ceramics, such as glass.

In some examples, a display mask can be applied to, or can be incorporated within or under the transparent cover 109. The display mask can be used to accent an unmasked portion of the display used to present visual content, and can be used to obscure or cover the device attachment feature 106. The tablet device 100 can include various ports that can be used to pass information between the tablet device 100 and the external environment. In particular, the data port 107 can facilitate the transfer of data and power to and from the tablet device 100. The tablet device 100 can also include speakers that can be used to output audio content. The table device 100 can also include one or more input components, such as the button 103 that can be used to provide an input signal to the tablet device 100. In some examples, a processor can use the signal from the button 103 to alter the operating state of the tablet device 100. For example, the button 103 can be used to reset a currently active page presented by the display assembly 108.

In some examples, the cover 110 can include a first magnetic component 112 that can be disposed inside the cover at a location designed to magnetically attract the device attachment feature 106 of the tablet device 100, when in a desired orientation. For example, the cover 110 can be attached to the tablet device 100 in an open configuration in which the display assembly 108 is fully viewable. In some examples, the cover 110 can include a flap 116. In one example, the flap 116 can have a size and shape corresponding to the display 108 and/or the transparent cover 109 of the device 100. In some examples, the flap 116 can be moveably or rotatably coupled to the device 100 by a hinge assembly (not shown) that can include the first magnetic component 112, as described herein. In some examples, a magnetic attachment force between the device attachment feature 106 and the first magnetic component 112 can maintain or secure the cover 110 to the tablet device 100 in a desired orientation. For example, an orientation wherein the cover 110 can be rotated between a position where the flap 116 entirely covers the display assembly 108 and a position where the flap 116 does not obscure or cover the display assembly 108.

In some examples, the cover 110 can further include a second magnetic component 114, for example, disposed in a location that can be positioned over or adjacent to one or more magnetic sensors 101, such as Hall effect sensors, of the device 100. In some examples, the second magnetic component 114 can produce a magnetic field that can be detected by a sensor 101 of the device 100, and that can facilitate one or more actions by the device 100. In some examples, a sensor 101 of the device 100 can detect when the second magnetic component 114 is within a threshold proximity of the sensor, and can change a state of the device based on such a detection. For example, when the sensor 101 of the device 100 detects that the second magnetic component 114 is within the threshold distance, such as when the cover 110 is disposed over the display 108, the sensor can provide a signal to a processor of the device 100 to initiate a state change, such as turning off the display 108. Further details regarding the features and structure of electronic devices and accessories including magnetic components are provided below, with reference to FIGS. 2A-2C.

Figure 2A:
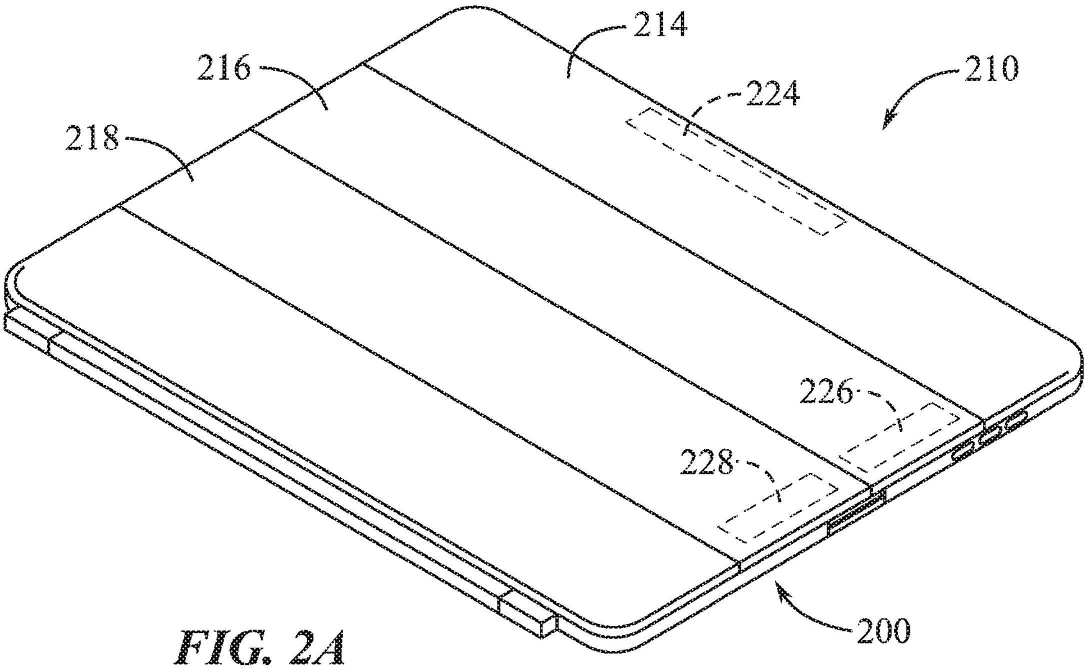
FIG. 2A shows a perspective view of a cover coupled to an electronic device.
Figure 2B:
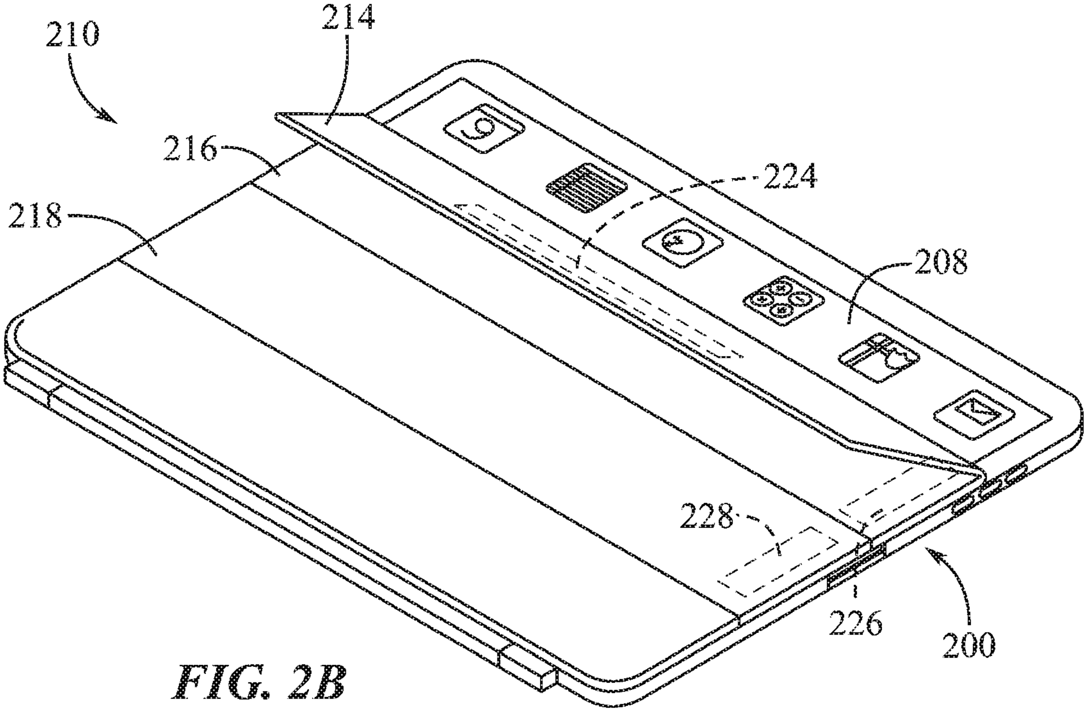
FIG. 2B shows a perspective view of the cover and electronic device of FIG. 2A in another configuration.
Figure 2C:
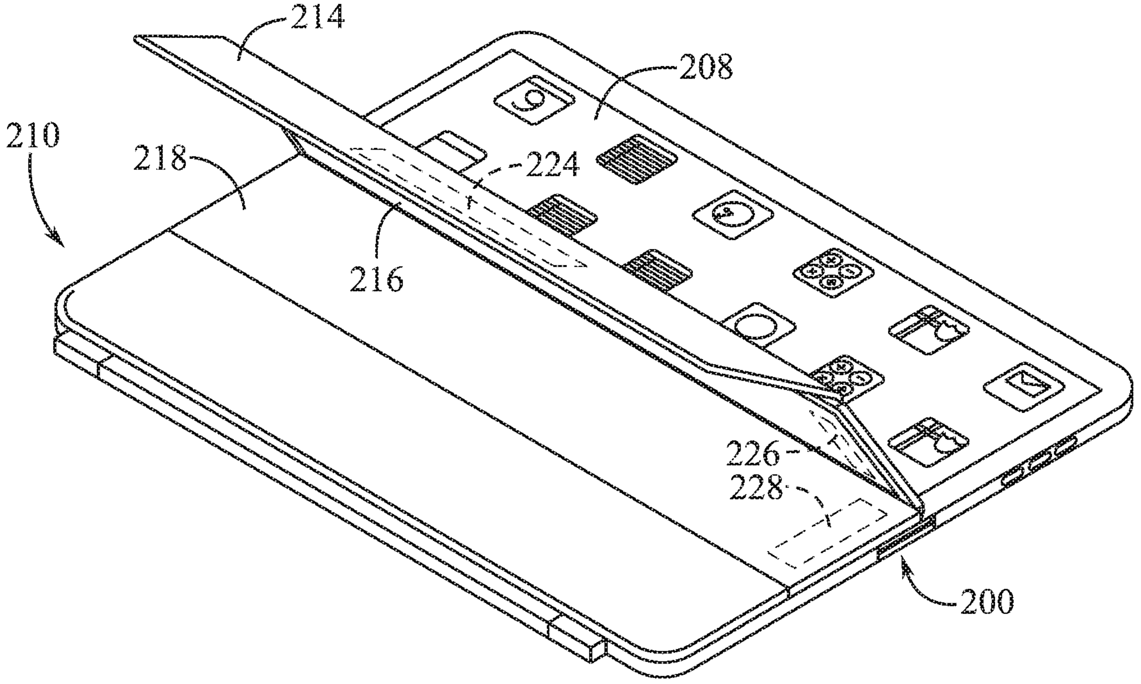
FIG. 2C shows a perspective view of the cover and electronic device of FIG. 2A in yet another configuration.

FIGS. 2A-2C show perspective views of an electronic device 200 and a cover 210. The device 200 can be a tablet device, and can include some or all of the features of the electronic devices described herein, such as with respect to FIG. 1. Similarly, the cover 210 can include some or all of the features of the cover 110 described with respect to FIG. 1. In some examples, the cover 210 can include multiple segments 214, 216, 218 that can be rotatably or moveably attached to one another, such that one or more segments can be moved relative to the device 100 without requiring the movement of other segments of the cover 210. In some examples, the segments 214, 216, 218 are not separate portions, but can be considered adjacent areas of a single flexible cover 210.

FIG. 2A illustrates the tablet device 200 and the cover 210 in a first, covered, or closed configuration, with the cover 210 completely obscuring or covering the display 208 of the device 200. In some examples, each of the segments 214, 216, 218 can include one or more magnetic components 224, 226, 228, as described herein. Further, the tablet device 200 can include sensors therein that can detect when each individual segment 214, 216, 218 has been lifted or moved from the device 200, for example, to reveal a portion of the display 208, as shown in FIG. 2B.

More particularly, when segment 214 is lifted from the display 208, sensors in the tablet device 100 can detect that segment 214 has been lifted therefrom. For example, the sensor can be a Hall effect sensor disposed within the device 200 at a location adjacent to the magnetic component 224 of segment 214, when in the closed configuration. When the sensor detects that the magnetic field exerted by the magnetic component 224 has dropped below a threshold, for example, because the segment 214 has been lifted by a user, the sensor can provide a signal to the device 200, and the device 200 can selectively activate only the exposed portion of the display 208 as illustrated in FIG. 2B. Additional sensors, such as optical sensors, can provide additional information to the device 200, for example, to confirm that only segment 214 has been lifted or moved, or if additional segments 216, 218 have been lifted or moved.

As shown in FIG. 2B, when the tablet device 200 has determined that segment 214 has been lifted, the tablet device 200 can change its operating state to a "peek" state in which only the exposed portion of the display 208 actively presents visual content, for example, in the form of icons or text. Accordingly, information in the form of visual content such as the time of day, notes, and other information can be presented for viewing on only that portion of display 208 that is viewable. In some examples, the sensor or sensors of the device 200 can detect that segment 214 has been placed back on or over the display 208, in which case, the tablet device 200 can enter another operational state, such as a "sleep" state where the display 208 is not active.

As shown in FIG. 2C, an additional segments 216 can be lifted from the device 200 to further expose the display 208. When additional sensors of the device 200 detect that the magnetic component 226 disposed in the segment 216 has been moved or lifted away from the display 208, additional portions of the display can be activated. In this way, the "peek" mode can be extended to activate as much of the display 208 as is revealed by the lifted segments 214, 216. Further, additional visual information, such as icons or text, can be presented by the activated portions of the display. In some examples, as additional segments are lifted from the device 200, such as segment 218 and magnetic component 228, additional corresponding portions of the display 208 can be activated. In this way, an extended "peek" mode can be provided.

In some examples, the tablet device 200 can respond to signals from the sensors contained therein, such as Hall effect sensors, by activating the display 208 when any of the segments 214, 216, 218 are moved away from the display 208, and deactivating the display 208 when the display 208 is covered by one or more of the segments 214, 216, 218. Further details regarding the features and structure of electronic devices and accessories including magnetic components are provided below, with reference to FIG. 3.

Figure 3:
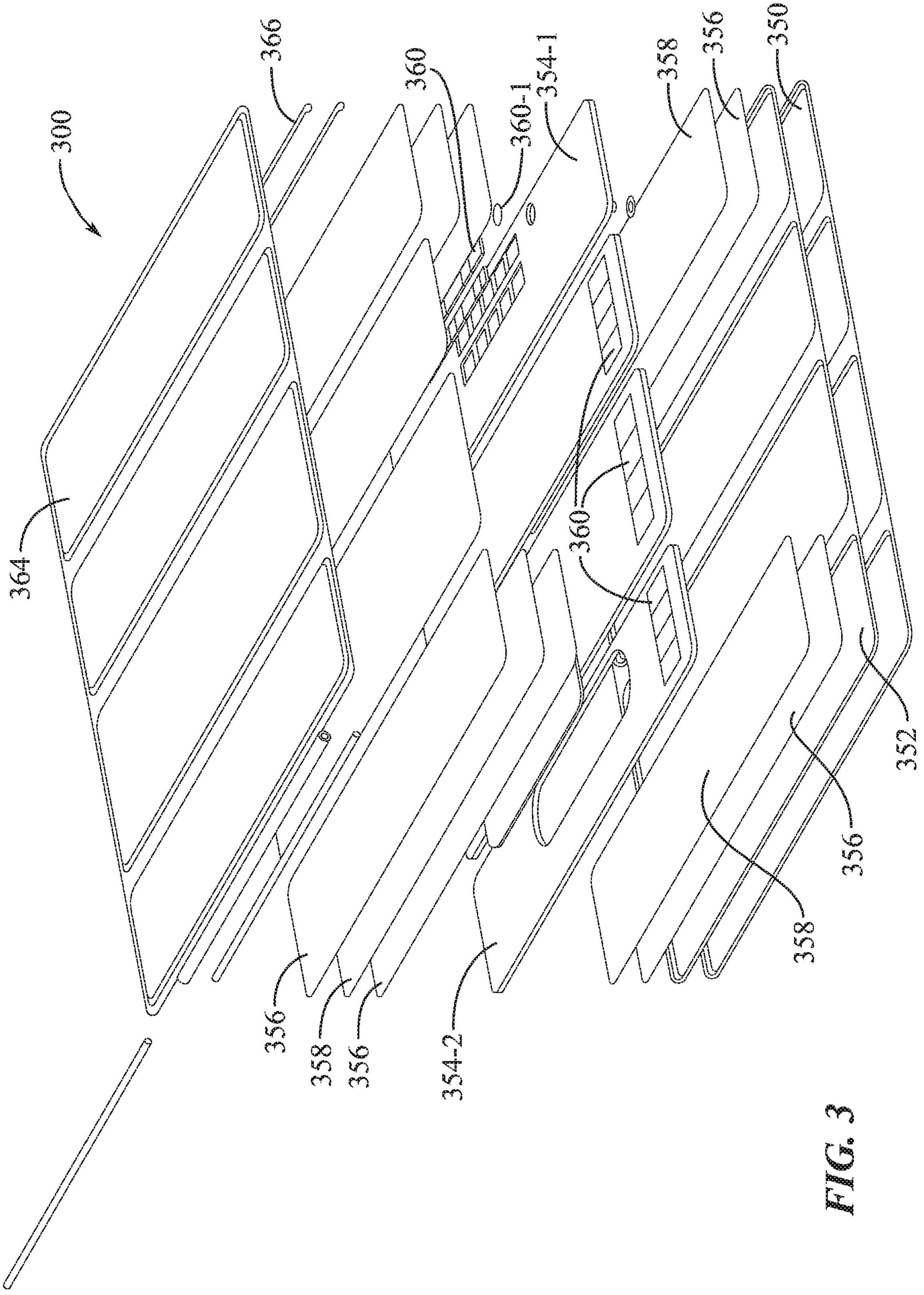
FIG. 3 shows an exploded view of an electronic device cover.

FIG. 3 shows an exploded view of a segmented cover 300. The cover 300 can include some or all of the features of the covers described herein, such as covers 110, 210 described with respect to FIGS. 1 and 2A-2C. In some examples, the cover 300 can include a bottom or base layer 350 that can come in direct contact with a surface of an electronic device, such as a transparent cover of a display, for example a display of an electronic device. Bottom layer 350 can be formed of a material that can passively clean the surface. The material can be, for example, a microfiber material. Bottom layer 350 can be attached to a layer 352 formed of a material such as a polymeric material and/or woven or fabric material that can provide a desired amount of thickness, resilience, and/or flexibility to the cover 300. The layer 352 can, in turn, be attached to inserts 354 to form a laminate structure including adhesive layers 356, laminate material 358, and insert 354. In some examples, the cover 300, including the layer 352, can be flexible and can bend or deform at any desired location.

In some examples, one or more inserts 354 can accommodate embedded components, such as electronic components and/or magnetic components. For example, insert 354-1 can accommodate a magnet component 360. In some examples, a magnetic component 360 can be positioned to magnetically attract and/or cooperate with a corresponding attachment feature embedded in an electronic device, such as device 100, 200 described herein. In some examples, the attraction between the magnetic component 360 and a corresponding magnetic material of an electronic device can assist in securing the cover 300 to an electronic device. In some examples, at least one magnet component 360-1 can be positioned and sized to interact with a magnetically sensitive circuit, such as a Hall effect sensor, incorporated within an electronic device, as described herein. It should be noted that whereas some of the magnetic components 360 can be specifically allocated to interact primarily with an attachment feature of an electronic device, in some examples, one or more magnetic components 360 can magnetically interact with one or more other magnetic components 360 embedded in the cover 300, for example, to form the cover into a configuration acting as a support structure. Further, in some examples, the magnetic components 360 can be as flexible as the inserts 354 or other material of the cover in which the magnetic components 360 are disposed. Accordingly, in some examples, the cover 300 can be flexible or bendable at any desired location, including at the magnetic components 360.

In some examples, additional laminate structures can be formed of an adhesive layer(s) 356, a laminate material 358 and a top layer 364. In some examples, an intervening layer of material can be provided having a knitted structure that can aid in the attachment of the top layer 364. The top layer 364 can be formed of many materials such as plastic, leather, woven fabrics, and other materials that can provide a desired level of flexibility, resilience, and/or aesthetic appearance. In some examples, in order to provide structural support to one or more desired areas of the cover 300, the top layer 364 can have edges reinforced by reinforcement bars 366 that can be formed of plastic or other rigid or semi-rigid material.

Any number or variety of electronic devices, accessories, or components can include one or more magnetic components as described herein. The process for forming such a magnetic component can include any form of molding, casting, curing, or other forming method that can provide a magnetizable powder with a flexible binder. A magnetic component can be flexible and can elongate greater than 5%, 10%, 20%, or 30% or greater before a permanent or plastic deformation of the magnetic component occurs and can include any combination of properties of the examples of magnetic components described herein. Further, in some examples, the magnetic component can be disposed in the internal volume of a device or component and/or surrounded or partially surrounded by a material of the device or component. Various examples of components, accessories, and electronic devices including the one or more magnetic components as described herein, as well as processes for magnetizing and forming magnetic components are described below with reference to FIGS. 4-5.

Figure 4:
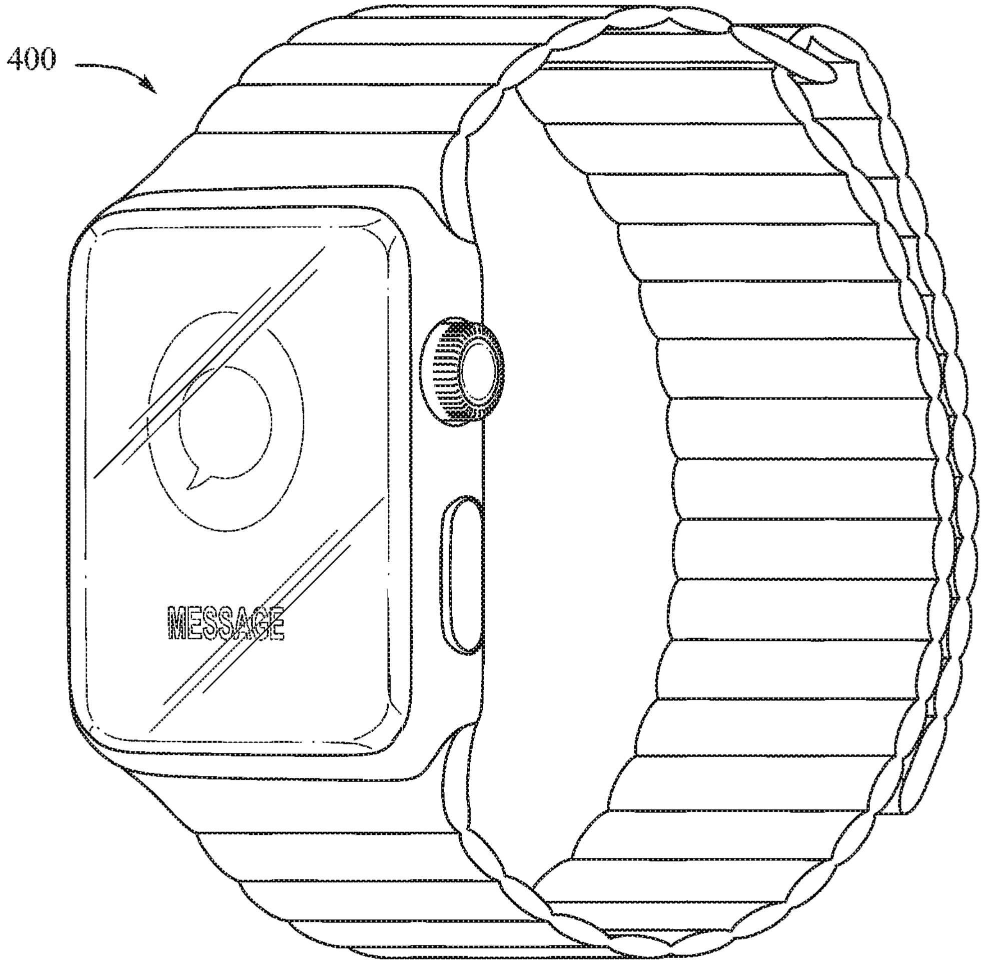
FIG. 4 shows a perspective view of an electronic device.

FIG. 4 shows an example of an electronic device 400, such as a smartwatch. The smartwatch 400 of FIG. 4 is merely one representative example of a device that can be used in conjunction with the components and methods disclosed herein. The electronic device 400 can correspond to any form of wearable electronic device, portable media player, media storage device, portable digital assistant ("PDA"), tablet computer, computer, mobile communication device, GPS unit, remote control device, or other electronic device. The electronic device 400 can be referred to as an electronic device, or a consumer device. Further details of the watch 400 are provided below with reference to FIG. 5.

Figure 5:
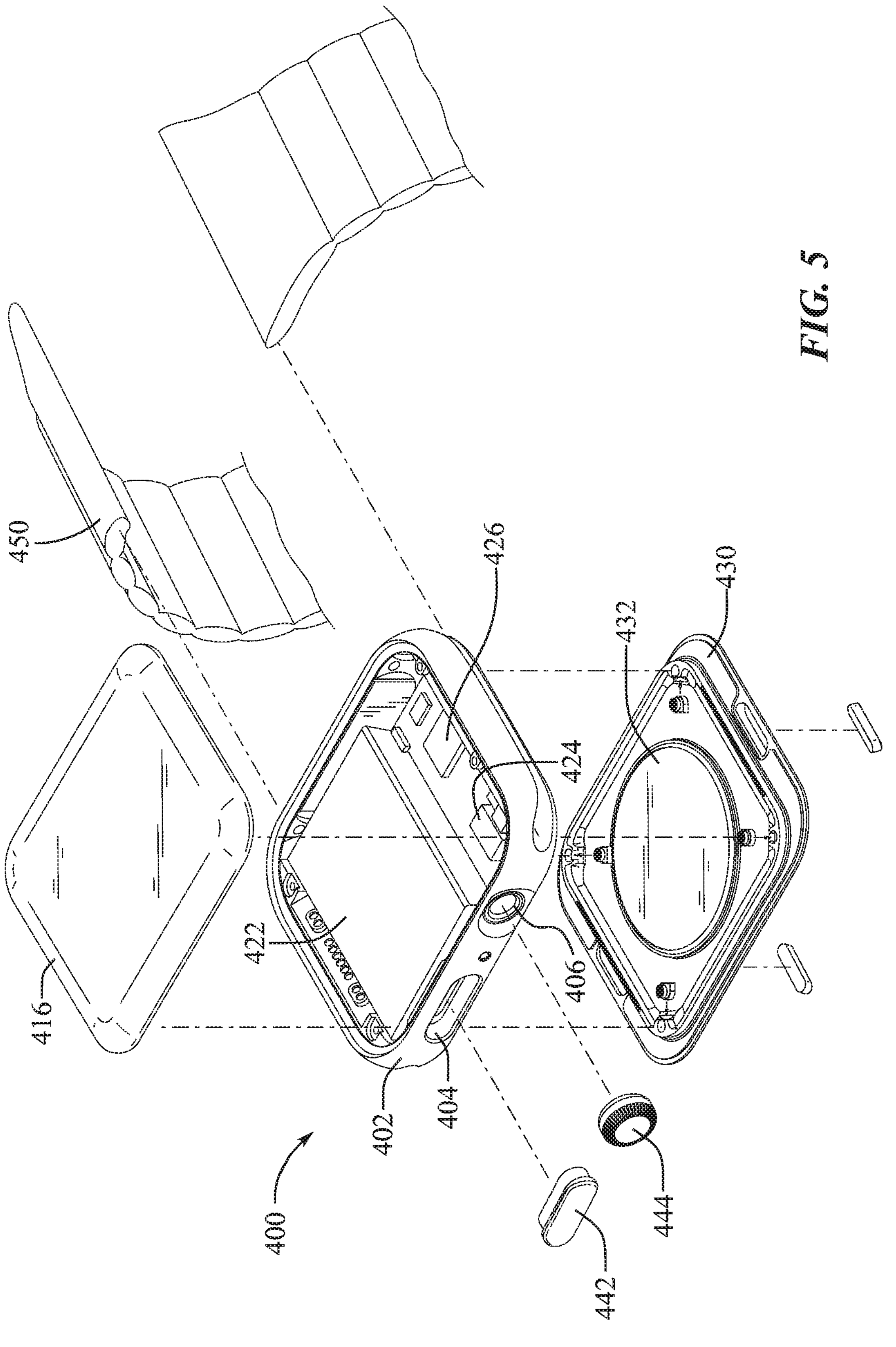
FIG. 5 shows an exploded view of a portion of the electronic device of FIG. 4.

Referring now to FIG. 5, the electronic device 400 can include a housing 402, and a cover 416 attached to the housing. The housing 402 can substantially define at least a portion of an exterior surface of the device 400. The cover 416 can include glass, plastic, or any other substantially transparent material, component, or assembly. The cover 416 can cover or otherwise overlay a display, a camera, a touch sensitive surface, such as a touchscreen, or other component of the device 400. The cover 416 can define a front exterior surface of the device 400. A back cover 430 can also be attached to the housing 402, for example opposite the cover 416. The back cover 430 can include ceramic, plastic, metal, or combinations thereof. In some examples, the back cover 430 can include an electromagnetically transparent portion 432. The electromagnetically transparent portion 432 can be transparent to any wavelength of electromagnetic radiation, such as visual light, infrared light, radio waves, or combinations thereof. The electronic device 400 can also include any number or type of sealing components that can serve to prevent the ingress of water or liquid into portions of the internal volume. Together, the housing 402, cover 416, and back cover 430 can substantially define an interior volume and an exterior surface of the device 400.

The housing 402 can be a substantially continuous or unitary component, and can include one or more openings 404, 406 to receive components of the electronic device 400 and/or provide access to an internal portion of the electronic device 400. In some examples, the device 400 can include input components, such as one or more buttons 442 and/or a crown 444. In some examples, the housing 402 can include a magnetic material at one or more desired locations. For example, the housing 402 can include a magnetic material at a location corresponding to a desired attachment location of a magnetic component, as described herein.

The electronic device 400 can further include a strap 450, or another component designed to attach or secure the device 400 to a user, or to provide wearable functionality. In some examples, the strap 450 can be a flexible material that can comfortably allow the device 400 to be retained on a user's body at a desired location. Further, the housing 402 can include a feature or features that can provide attachment locations for the strap 450, for example, including a magnetic material. In some examples, the strap 450 can include one or more magnetic components, as described herein. Accordingly, the strap 450 can include a magnetic component or components that are attracted to the magnetic material disposed in the housing 402 or inside the internal volume defined by the housing 402. In this way, the strap 450 can be secured to the housing 402, but can also be easily removeable by a user. In some examples, the strap 450 and/or housing 402 can include other retention features or retention components that mechanically retain the strap 450 against the housing 402.

The device 400 can also include internal components, such as a haptic engine 424, a battery 422, and a system in package (SiP), including one or more integrated circuits 426, such as processors, sensors, and memory. The SiP can also include a package. The internal components, such as one or more of components 422, 424, 426 can be disposed within an internal volume defined at least partially by the housing 402, and can be affixed to the housing 402 via internal surfaces, attachment features, threaded connectors, studs, posts, or other features, that are formed into, defined by, or otherwise part of the housing 402, the cover 416, and/or the back cover 430. Further, in some examples, magnetic material and/or one or more magnetic components can be disposed in the internal volume, for example, to interact with or retain one or more accessories including magnetic components, as described herein. Various examples of components, accessories, and electronic devices including the one or more magnetic components as described herein, as well as processes for magnetizing and forming magnetic components, are described below with reference to FIGS. 6A-7C.

Figure 6B:
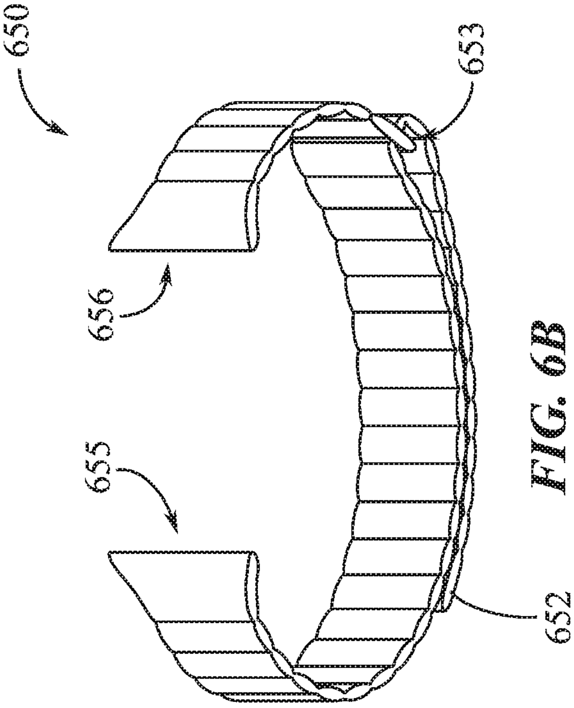
FIG. 6B shows a perspective view of the component of FIG. 6A in another configuration.
Figure 6A:
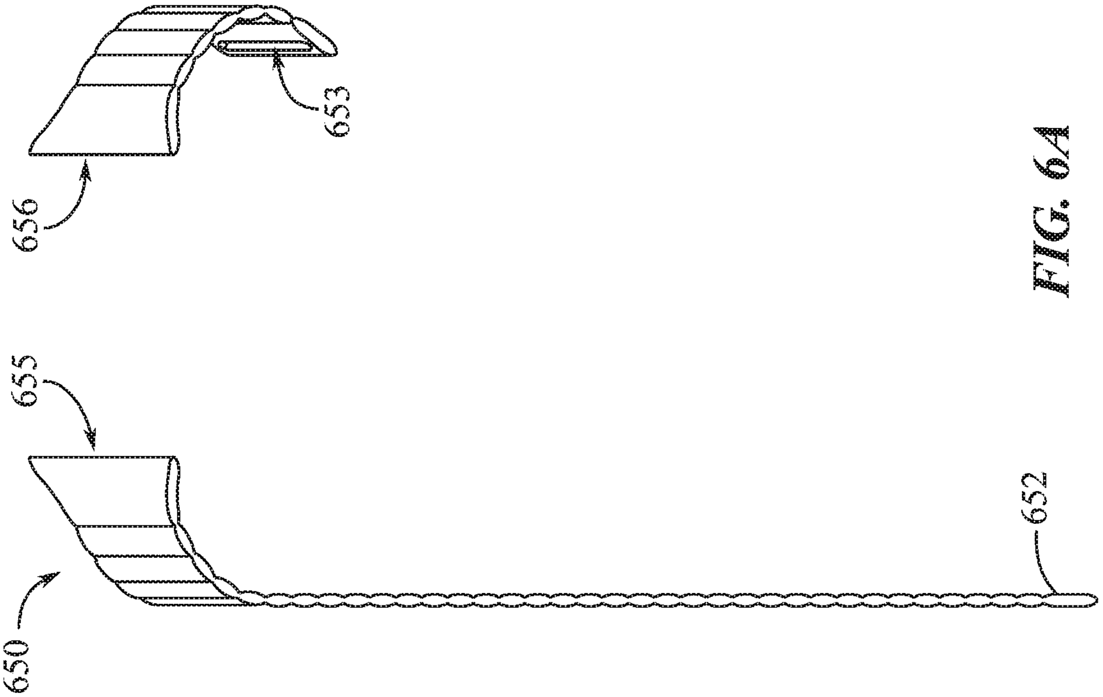
FIG. 6A shows a perspective view of a component of a wearable device.

FIG. 6A shows a perspective view of a band or a strap 650 of a wearable electronic device. The band 650 can include some or all of the features of the band 450 described herein with respect to FIG. 5. Specifically, FIG. 6A illustrates a band 650 including a first strap portion 655 and second strap portion 656. In some examples, the first strap portion 655 and the second strap portion 656 can be formed from substantially the same material or combination of materials, and can be flexible and/or deformable, as described herein. In some examples, the first strap portion 655 and the second strap portion 656 can be formed from flexible organic materials such as polymers or leather, and can include magnetic components enclosed or surrounded by the organic materials, as described herein.

In some examples, and as shown, the second strap portion 656 can include a loop 653 positioned at an end adjacent the first strap portion 655. In some examples, and as shown in FIG. 6B, an end 652 of first strap portion 655, for example an end or portion not coupled to the corresponding device, can be feed and/or positioned through the opening or aperture defined by the loop 653, and a portion of the first strap portion 655 can be folded back on itself to couple the strap 650 and attached wearable electronic device to a user or a desired object. In some examples, the loop 653 can be formed from any substantially rigid and/or resilient material, including materials the same as, or different from, the materials of the second strap portion 656. For example, the loop 653 can be formed from a metallic material and can be coupled to the material forming the second strap portion 656.

As described herein, in some examples, at least the first strap portion 655 can include one or more magnetic components disposed therein. For example, the first strap portion 655 can include one or more magnetic components surrounded by, or embedded in, the material forming the first strap portion 655. As such, a section of the first strap portion 655 including a magnetic component can be folded back over itself after passing through the loop 653, whereupon the magnetic component can be positioned relative to one or more other magnetic components in the first strap portion 655. The magnetic components can be magnetically attracted to one another as described herein to thereby secure the first strap portion 655 and prevent the undesired passing of the first strap portion 655 back through the loop 653.

When a user desires to remove the strap 650, the user can pull on or otherwise exert a force on the first strap portion 655 to separate the magnetic components contained therein from one another, and to allow the first strap portion 655 to be fed back through the loop 653.

Further, as shown, one or both strap portions 655, 656 can include one or more ridges or other non-planar features that can mechanically aid or assist the magnetic components in preventing the undesirable sliding of the coupled sections of the first strap portion 655 relative to one another. In some examples, these ridges or other features can correspond to, or can be disposed between the one or more magnetic components contained in the strap portion or portions 655, 656, and can aid or assist in aligning the magnetic components of the strap portion 655 with one another. Further details regarding the features and structure of electronic devices and accessories including magnetic components are provided below, with reference to FIGS. 7A-7C.

Figure 7B:
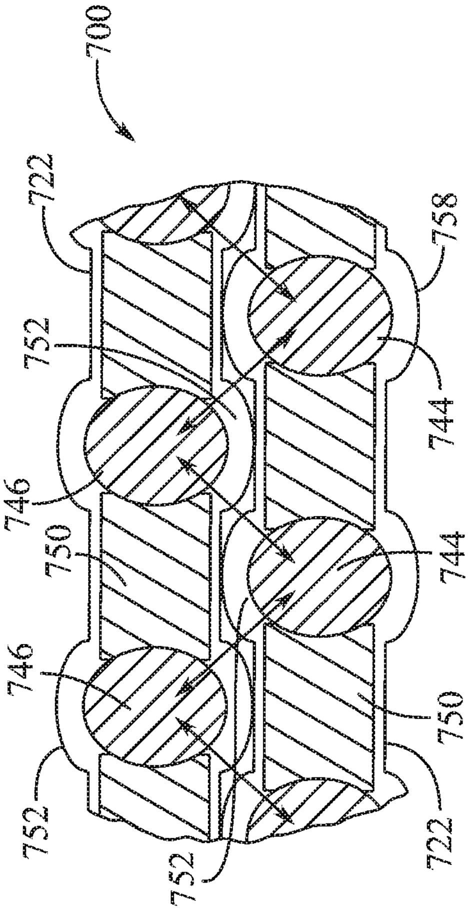
FIG. 7B shows a close-up cross-sectional side view of the component of FIG. 7A.
Figure 7C:
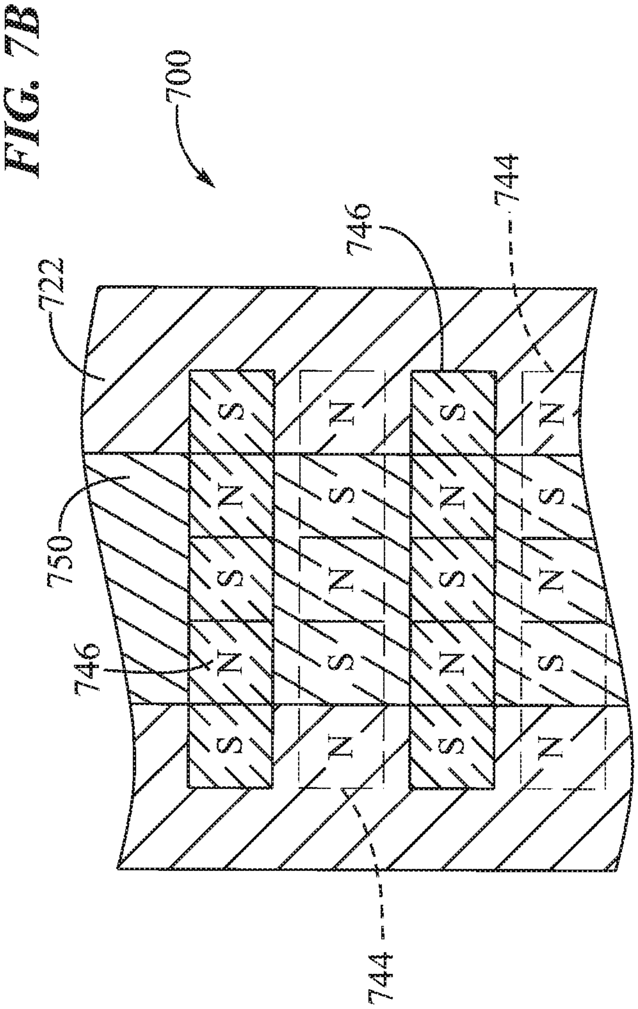
FIG. 7C shows a close-up cross-sectional top view of the component of FIG. 7A.
Figure 7A:
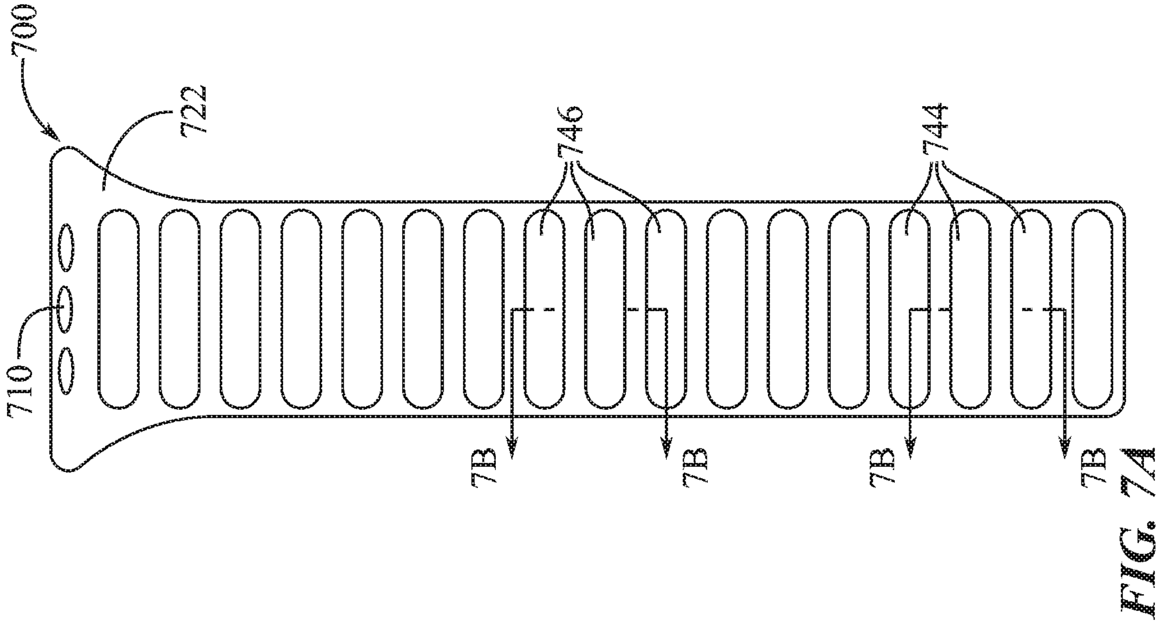
FIG. 7A shows a front view of a component of a wearable device.

FIG. 7A illustrates a strap portion 700, that can include some or all of the features of any of the straps or strap portions described herein, such as strap portion 655 described with respect to FIGS. 6A and 6B. In some examples, the strap portion 700 of FIG. 7A can be coupled to an electronic device, such as a wearable device, and can be used to secure or otherwise attach the coupled device to a user or a desired object.

In some examples, the strap portion 700 can include a material that can form a body 722 of the strap portion 700. In some examples, the material can be a flexible, bendable, or otherwise deformable material, as described herein, and can allow the strap portion 700 to naturally conform to the object around which it can be secured, such as a user's wrist. In some examples, the material forming the body 722 can include a polymeric material, a ceramic material, a metallic material, or combinations thereof. In some examples, the material forming the body can be a natural polymer material, a synthetic polymer material, or combinations thereof. In some examples, the material forming the body 722 can be an organic material or materials, such as leather or hide. In some examples, the material of the body 722 can include a woven or fabric material, although any substantially flexible or deformable material can be used. In some examples, the material of the body 722 can be designed to provide a desired level of comfort when worn on a user, and can be selected to prevent irritation with a user's skin under a wide range of conditions, and to provide a desired texture and feel, such as a soft and compliant feel when worn.

In some examples, the strap portion 700 can include one or more magnetic components 710 that can be magnetic retention components 710. The magnetic retention component 710 can correspond with and attract and/or be attracted to a magnetic material in an electronic device to couple and retain the strap portion 700 thereto, for example, as described with respect to strap 450 and electronic device 400 of FIG. 5.

The strap portion 700 can further include one or more magnetic components 744, 746 at least partially encased in, surrounded by, or otherwise carried in the strap portion 700. For example, where the material of the body 722 is a polymer, the magnetic components 744, 746 can be embedded in or can be surrounded by the polymer. In some examples, the material of the body 722 can be molded around the magnetic components 744, 746, or can be formed around or made to enclose the magnetic components by any desired method. In some examples, the body 722 can be formed from multiple pieces or sections of material that can be sealed or coupled together around the magnetic components 744, 746. For example, two strips or sections of a material, such as fabric or leather, can be joined alone their edges, such as by stitching, with the magnetic components 744, 746 disposed therebetween.

In some examples, these magnetic components 744, 746 can be flexible magnetic components, as described herein, and can bend and conform to a desired shape when the strap is deformed to secure an electronic device to a user. Accordingly, the magnetic components 744, 746 can provide a desired level of comfort to a user, and can allow the entire strap portion 700 to naturally conform to whatever object it is secured around without creating pressure points and without including rigid components that can present an undesirable feel and experience to a user.

When the strap portion 700 is folded over on itself, for example, as described and shown with respect to strap portion 655 in FIG. 6B, one or more first magnetic components 744 can be disposed relative to one or more second magnetic components 746 and a magnetic attraction between these components 744, 746 can secure the strap portion 700 to itself, as described herein. A close-up cross-sectional view of a section of the strap portion 700 in this folded configuration is shown in FIG. 7B.

As can be seen in FIG. 7B, the strap portion 700 can include the magnetic components 744, 746 encased or surrounded by the material of the body 722. In some examples, the strap portion 700 can also include one or more structural components 750 that can also be encased in, or surrounded by, the material of the body 722. These structural components 750 can, for example, be disposed between adjacent magnetic components 744, 746, and can provide the strap portion 700 with a desired level of resilience, flexibility, conformability, or any other desired property. In some examples, the structural portions can be flexible and can have a flexibility that is similar to the flexibility of the magnetic components 744, 746. This can allow the strap portion 700 to have a desired feel, for example, such that the user can perceive the structural components 750 and the magnetic components 744, 746 as a continuous portion of a flexible or deformable material. In some examples, the structural components 750 can be any desired material, such as flexible polymeric materials, and in some examples, can include one or more of the materials of the magnetic components 744, 746 described herein.

As shown, in this folded configuration, a first magnetic component 744 can be disposed relative to a second magnetic component 746, whereupon they can be magnetically attracted to, and/or coupled to, one another. That is, one or more second magnetic components 746 can be positioned adjacent and/or above one or more corresponding first magnetic components 744 of the strap portion 700, and can be magnetically coupled to the adjacent first magnetic components 744. The magnetic attraction forces between first magnetic components 744 and the second magnetic components 746 are illustrated in FIG. 7B, using reference arrows. In some examples, the magnetic polarity configuration of magnetic components 744, 746 can be configured or arranged such that the second magnetic components 746 are preferentially aligned between and magnetically coupled to two distinct first magnetic components 744 by the magnetic forces exerted therebetween. As a result, magnetic components 744, 746 can be aligned in the staggered configuration as shown in FIG. 7B when the strap portion 700 is secured to itself.

Additionally, as shown in FIG. 7B, the non-planar profile of the strap portion 700, for example including the protrusions 752 disposed over the magnetic components 744, 746 can aid in the staggered alignment of the first magnetic components 744 and second magnetic components 746. In some examples, the non-planer profile of the strap portion 700 including the protrusions 752 can not only aid in arranging the magnetic components 744, 746 in a desired configuration, but can provide a mechanical interlock or interference that can increase the amount of force needed to slide the coupled magnetic components 744, 746 relative to one another, thereby increasing the securement of the strap portion 700.

FIG. 7C shows a close-up cross-sectional top view of the strap portion 700 in the configuration illustrated in FIG. 7B. The alignment of the second magnetic components 746 above and adjacent to the first magnetic components 744 of the strap portion 700 described with respect to FIG. 7B is shown, as well as the magnetic polarity arrangement of the magnetic components 744, 746. As can be seen, the polarity arrangement of the magnetic components 744, 746 is such that when the strap portion 700 is disposed in the desired securement configuration opposite poles (for example illustrated as north (N) and south (S)) of the magnetic components 744, 746 are disposed adjacent to one another so that the magnetic components 744, 746 are magnetically attracted and/or coupled with one another.

In some examples, the first magnetic components 744 and the second magnetic components 746 can be magnetized and/or can include various alternating magnetic fields or polarities (for example illustrated as north (N) and south (S)) over the length of the magnetic component 744, 746. In some examples, the first magnetic components 744 can include a first arrangement of polarities over the length of the magnetic component 744, and the second magnetic component can include a second arrangement of polarities over the length of the magnetic component 746 that is distinct from the first arrangement. In some examples, the first and second arrangements of polarities can be corresponding but opposite arrangements of polarities. In some examples, one or both of the arrangements can include alternating magnetic poles. Although specific polarity arrangements of the magnetic components 744, 746 are shown in FIG. 7C, the magnetic components 744, 746 can include any arrangement or number of magnetic polarities such that the first and second magnetic components 744, 746 are attracted to one another to secure the strap portion 700, as described herein. Various examples of components, accessories, and electronic devices including the one or more magnetic components as described herein, as well as processes for magnetizing and forming magnetic components are described below with reference to FIGS. 8-9B.

Figure 8:
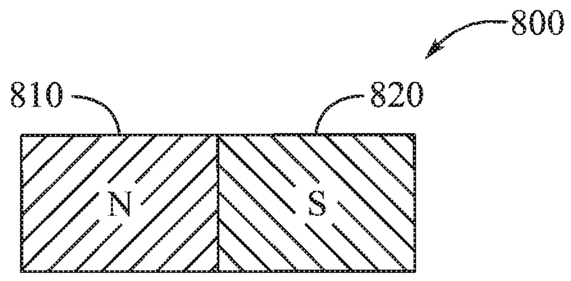
FIG. 8 shows a cross-sectional view of a magnetic component.

FIG. 8 shows a cross-sectional view of a magnetic component 800 that can be included in an electronic device, securing component, or other flexible component as described herein. The magnetic component 800 can include some or all of the features of the magnetic components described herein, such as magnetic components 744, 746 described with respect to FIGS. 7A-7C. In the present example, the magnetic component 800 can include one or more portions 810, 820, each having a desired magnetic polarity (for example illustrated as north (N) and south (S)).

In some examples, a first portion 810 can have a first magnetic polarity (N) and can be disposed adjacent to a second portion 820 having a second magnetic polarity (S). The first and second magnetic polarities can be different from one another and can be opposites, as shown. In some examples, the first and second portions 810, 820 can be disposed adjacent to one another. In some examples, the second portion 820 can partially or entirely surround the first portion 810. In some examples, the magnetic component 800 can have any desired shape. For example, the magnetic component 800 can have a rectangular or bar shape, a circular shape, a square shape, a triangular shape, a cube shape, a spherical shape, a rod shape, or any other geometric shape.

Further, although described as separate portions 810, 820, these portions 810, 820 can be regions of a singular, unitary, or continuous portion of material that includes the magnetic component 800, and can be distinguishable from one another only by their polarities, rather than any type of material, compositional, or physical boundary. In some examples, however, one or more of the portions 810, 820 can be formed separate from one or more other portions 810, 820, and can be joined thereto by any desired method, such as fusing, gluing, and/or adhering. In some examples, one or more of the portions 810, 820 can include a different material than the other portion, such that the magnetic component 800 can be a hybrid magnetic component 800. For example, the portion 810 can include a flexible material including a magnetizable powder and a flexible polymer binder, as described herein, while the second portion 820 can include a conventionally formed sintered magnetic material. Further, although the present example includes two portions 810, 820 of alternating magnetic polarities, the magnetic component 800 can include any number of portions in any desired size or shape.

In some examples, the magnetic component 800 can include a magnetizable powder that is encased in, embedded in, surrounded by, or otherwise carried by a flexible binder material. In some examples, the flexible binder material can be any material that can encase, surround, and/or carry a desired amount of the magnetizable powder while retaining a desired level of material properties, such as flexibility or the ability to deform or elongate. In some examples, the flexible binder material can include one or more polymers. For example, the flexible binder can include rubber, silicone, an elastomer material, or combinations thereof. In some examples, the flexible binder can include nitrile butadiene rubber, silicone, a fluoroelastomer such as fluo-rubber, or combinations thereof.

In some examples, the magnetizable powder can be an isotropically magnetizable powder. In some examples, the magnetizable powder can include one or more rare earth elements, such as neodymium and/or samarium. In some examples, the magnetizable powder can include additional elements or components, such as additional metallic elements or components. For example, the magnetizable powder can include iron, boron, cobalt, and/or other elements. In some examples, the magnetizable powder can be a rare earth magnet powder and can include neodymium iron boron (NdFeB) powder and/or samarium cobalt (SmCo) powder.

In some examples, the magnetizable powder of the magnetic component 800 can be isotropically magnetizable. In some other examples, however, the magnetizable powder of the magnetic component 800 can be partially isotropic or partially isotropically magnetizable. For example, the magnetizable powder of the magnetic component 800 can be isotropic in a plane, but anisotropic in directions perpendicular to the plane. In some examples, the magnetizable powder can be exposed to a magnetic field as the magnetic component 800 is being formed, such as during a molding process, so that the magnetizable powder preferentially aligns with the magnetic field. Upon curing or solidifying of the binder material, the orientation of the magnetizable powder can be fixed, and the magnetic field can be removed, producing the partially isotropic magnetic component 800 that is isotropic in two spatial dimensions and anisotropic in a third spatial dimension.

The ratio of the amount of magnetizable powder relative to the flexible binder material in the magnetic component 800 can have any desired value that is capable of providing the magnetic component 800 with desired mechanical and magnetic properties, as described herein. In some examples, the magnetic component 800 can include a larger volume percentage of the magnetizable powder than the flexible binder material. In some examples, the magnetic component 800 can include greater than about 60 volume percent (vol %) of the magnetizable powder. In some examples, the magnetic component 800 can include between about 55 vol % and 75 vol % of the magnetizable powder, or between about 60 vol % and 70 vol % of the magnetizable powder, for example about 65 vol %.

As described herein, the material of the magnetic component 800, for example including a magnetizable powder and a flexible binder, can have desired levels of strength, hardness, density, and deformability or ability to flex or elongate. In some examples, the tensile strength of the material of the magnetic component 800 can be greater than about 1 megapascal (MPa), greater than about 2 MPa, greater than about 5 MPa, or even greater. In some examples, the material of the magnetic component 800 can have a hardness of between about 20 and 80 on the Shore D hardness scale. In some examples, the material of the magnetic component 800 can have a density of between about 4 grams per cubic centimeter (g/cm$^3$) and 8 g/cm$^3$. For example, the material of the magnetic component 800 can have a density of between about 5 g/cm$^3$ and 6.5 g/cm$^3$, or between about 5.4 g/cm$^3$ and 6 g/cm$^3$. In some examples, the magnetic component 800 and/or the material forming the magnetic component 800 can elongate greater than about 20% before any permanent or plastic deformation of the material and/or magnetic component 800 occurs. That is, the magnetic component 800 can be stretched in any dimension or dimensions to greater than about 120% of its original dimension or dimensions by exerting a force thereon and can still naturally return to its original dimension or dimensions upon removal of the stretching force. In some examples, the material forming the magnetic component 800 can elongate greater than about 30%, greater than about 40%, greater than about 50%, greater than about 60%, greater than about 70%, or even up to about 80% before any permanent or plastic deformation of the material and/or magnetic component 800 occurs. Further details regarding examples of a magnetic component 900, including details regarding the attractive forces experienced and exerted by the magnetic component 900 are described with respect to FIGS. 9A-9B.

Figure 9A:
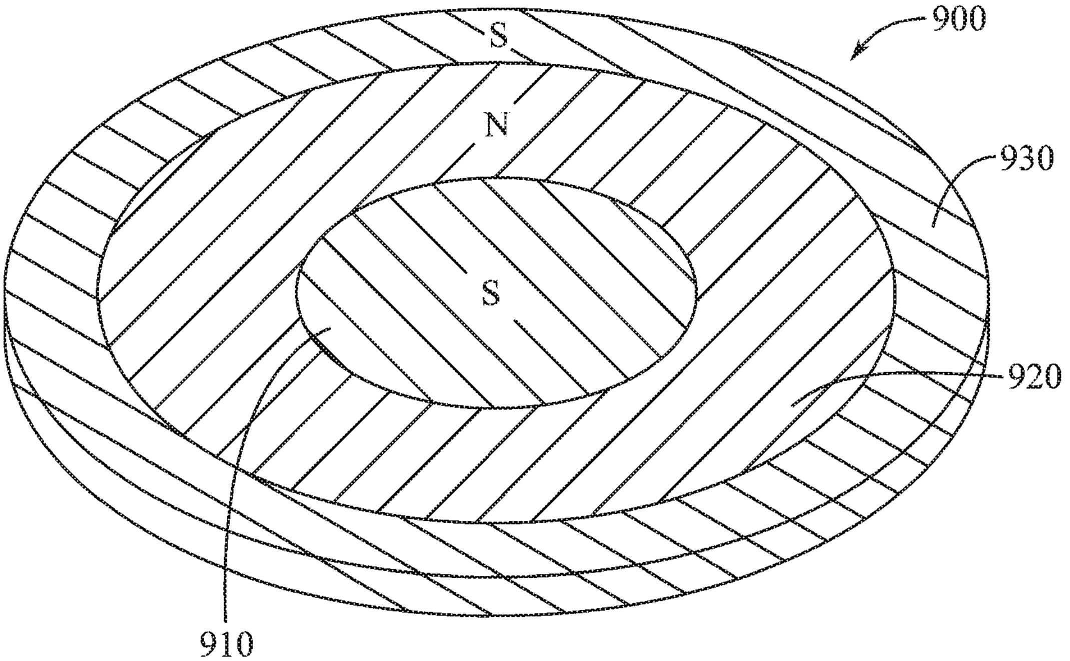
FIG. 9A shows a perspective view of a magnetic component.

FIG. 9A shows a magnetic component 900 that can be included in an electronic device, securing component, or other flexible component, as described herein. The magnetic component 900 can include some or all of the features of the magnetic components described herein, such as magnetic components 744, 746, 800 described with respect to FIGS. 7A-7C and 8. In the present example, the magnetic component 900 can include multiple portions 910, 920, 930, each having a desired magnetic polarity (for example illustrated as north (N) and south (S)).

In some examples and as illustrated, a first portion 910 can have a first magnetic polarity (S) and can be disposed adjacent to a second portion 920 having a second magnetic polarity (N). The first and second magnetic polarities can be different from one another and can be opposites, as shown. The magnetic component 900 can include a third portion 930 disposed adjacent to the second portion 920 that has a third polarity (S) that can be different from the second polarity. The third polarity can be opposite the second polarity and the same as the first polarity, as shown. Accordingly, the magnetic component 900 can include multiple portions having alternating polarities. In some examples, the second portion 920 can partially or entirely surround the first portion 910, while the third portion 930 can partially or entirely surround the second portion 920. In some examples, however, the portions 910, 920, 930 can be disposed in any desired arrangement, configuration, or shape, including alternating polarities of adjacent portions.

In some examples, and as shown, the magnetic component 900 can have a substantially cylindrical or disc shape, although the magnetic component 900 can have any desired shape. For example, the magnetic component 900 can have a rectangular or bar shape, a square shape, a triangular shape, a cube shape, a sphere shape, a rod shape, or any other shape. In some examples, the materials of the magnetic component 900, as described herein, can allow for the formation of a magnetic component 900 that can be relatively thin, while still retaining desired levels of resilience, flexibility, and magnetic strength. For example, the magnetic component 900 can have a thickness less than about 5 millimeters (mm), less than about 2 mm, or less than about 1 mm or even smaller. In some examples, the magnetic component 900 can have a thickness between about 0.3 mm and 0.1 mm, which can allow the magnetic component 900 to be relatively light and, in some examples, imperceptible or nearly imperceptible to a user when included in a flexible component or device. The magnetic component 900 can have any desired diameter or width, for example, on the order of several millimeters, tens or millimeters, or even larger. In some examples, the magnetic component 900 can have a diameter of between about 10 mm and 50 mm, for example, about 25 mm.

Figure 9B:
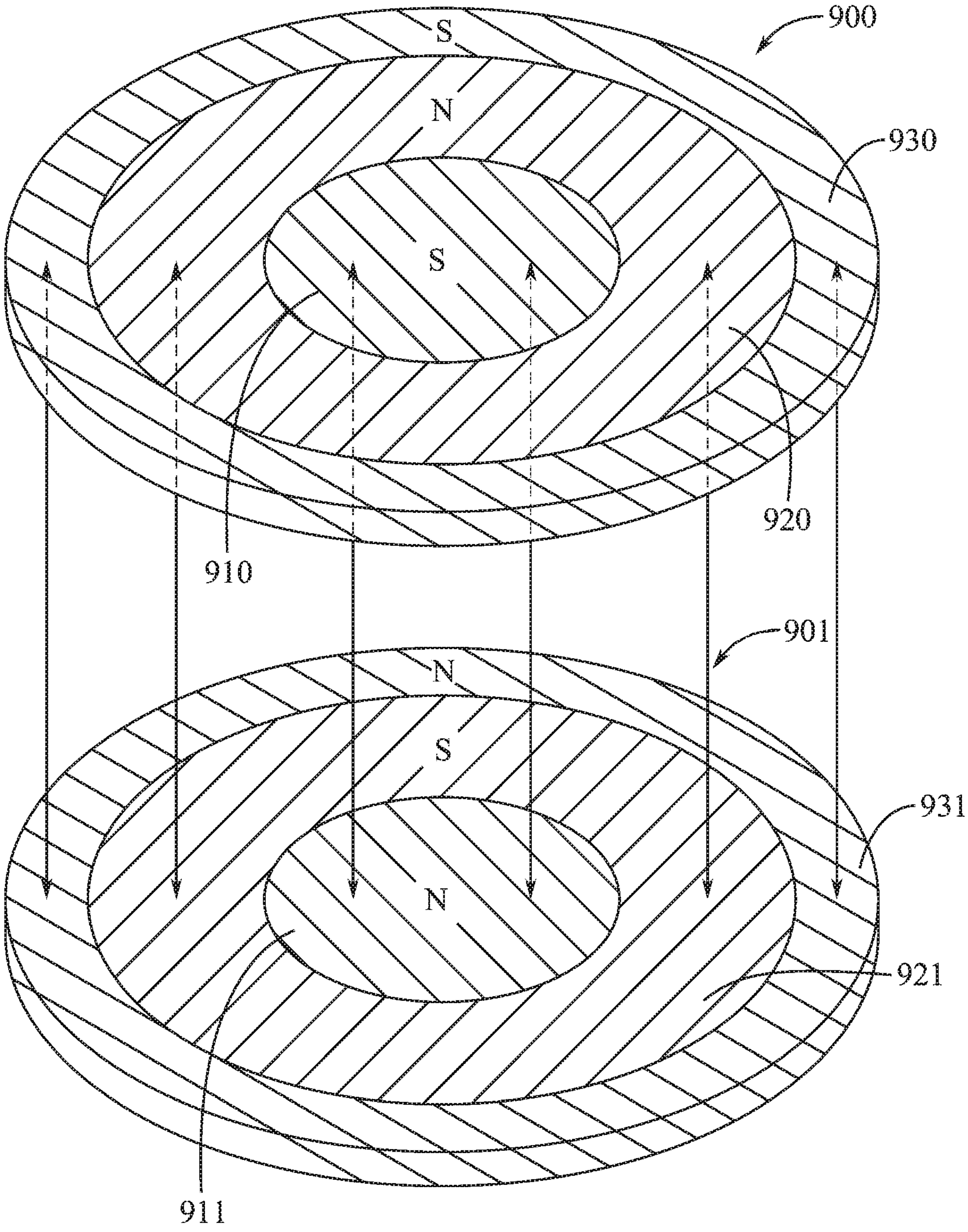
FIG. 9B shows a perspective view of corresponding magnetic components.

FIG. 9B illustrates the magnetic component 900 of FIG. 9A disposed relative to a second magnetic component 901 that can be substantially identical to the magnetic component 900 except that the portions 911, 921, 931 have the opposite magnetic polarity of portions 910, 920, 930 of magnetic component 900. As described herein, these magnetic components 900, 901 can exert an attractive magnetic force (indicated with reference arrows in FIG. 9B) on one another when brought into relative proximity. Further, in some examples, such as where the magnetic components 900, 901 include concentric portions 910, 920, 930 and 911, 921, 931 having alternating polarities, the arrangement of polarities can facilitate the alignment of the magnetic components 900, 901 with one another. As the magnetic components 900, 901 are brought together, the concentrically alternating arrangement of polarities of the magnetic components 900, 901 exert magnetic forces on one another that serve to center or align the magnetic components 900, 901 with respect to each other.

For example, if one of the magnetic components 900, 901 is moved laterally with respect to the configuration shows in FIG. 9B, the magnetic forces exerted on and by each magnetic component 900, 901 will cooperate such that the laterally displaced component 900, 901 is brought back to the position shown. In some examples, this feature of the magnetic components 900, 901 can be used to provide devices and components that can be self-aligning. In some examples, it can be desirable for one portion of a component including the magnetic component 900 to be aligned with a preferred location of a second portion of the component. Accordingly, the second magnetic component 901 can be disposed at this preferred location and when the portions are brought into proximity with one another, the magnetic forces exerted by the magnetic components 900, 901 can cooperate to align the portions.

In some examples, the magnetic component 900 can have or experience an attractive force per volume of greater than about 20 Newtons per cubic centimeter ($N/cm^3$) when it is disposed directly adjacent to or in direct contact with a substantially compositionally and dimensionally identical magnetic component 901 having an opposite magnetic polarity or arrangement of polarities. In some examples, the magnetic component 900 can have or experience an attractive force per volume of greater than about 25 $N/cm^3$ when it is disposed directly adjacent to a compositionally and dimensionally identical magnetic component 901 having an opposite magnetic polarity or arrangement of polarities. In some examples, the magnetic component 900 can have or experience an attractive force per volume of greater than about 30 $N/cm^3$, or greater than about 35 $N/cm^3$ when it is disposed directly adjacent to a compositionally and dimensionally identical, or nearly identical, magnetic component 901 having an opposite magnetic polarity or arrangement of polarities. In some examples, the magnetic component 900 can have or experience an attractive force per volume of about 30 $N/cm^3$ when it is disposed directly adjacent to a compositionally and dimensionally identical magnetic component 901 having an opposite magnetic polarity or arrangement of polarities.

In some examples, the magnetic component 900 can have or experience an attractive force per volume of greater than about 10 $N/cm^3$, greater than about 15 $N/cm^3$, or even greater than about 20 $N/cm^3$ when it is disposed approximately 0.8 mm from a compositionally and dimensionally identical magnetic component 901 having an opposite magnetic polarity or arrangement of polarities. In some examples, the magnetic component 900 can have or can experience an attractive force per volume of about 18 $N/cm^3$ when it is disposed approximately 0.8 mm from a compositionally and dimensionally identical magnetic component 901 having an opposite magnetic polarity or arrangement of polarities.

In some examples, the magnetic component 900 can resist a shear force per volume of greater than about 20 $N/cm^3$ when it is disposed directly adjacent to a compositionally and dimensionally identical magnetic component 901 having an opposite magnetic polarity or arrangement of polarities. In some examples, the magnetic component 900 can resist a shear force per volume of greater than about 25 $N/cm^3$, greater than about 30 $N/cm^3$, or even greater than about 35 $N/cm^3$, or greater, when it is disposed directly adjacent to a compositionally and dimensionally identical magnetic component 901 having an opposite magnetic polarity or arrangement of polarities. In some examples, the magnetic component 900 can resist a shear force per volume of about 34 $N/cm^3$ when it is disposed directly adjacent to a compositionally and dimensionally identical magnetic component 901 having an opposite magnetic polarity or arrangement of polarities.

In some examples, the magnetic component 900 can resist a shear force per volume of greater than about 10 $N/cm^3$ when it is disposed approximately 0.8 mm from a compositionally and dimensionally identical magnetic component 901 having an opposite magnetic polarity or arrangement of polarities. In some examples, the magnetic component 900 can resist a shear force per volume of greater than about 15 $N/cm^3$ or greater than about 20 $N/cm^3$ or even greater when it is disposed approximately 0.8 mm from a compositionally and dimensionally identical magnetic component 901 having an opposite magnetic polarity or arrangement of polarities. In some examples, the magnetic component 900 can resist a shear force per volume of about 16 $N/cm^3$ when it is disposed approximately 0.8 mm from a compositionally and dimensionally identical magnetic component 901 having an opposite magnetic polarity or arrangement of polarities. Various examples of components, accessories, and electronic devices including the one or more magnetic components as described herein, as well as processes for magnetizing and forming magnetic components are described below with reference to FIGS. 10-11.

Figure 10:
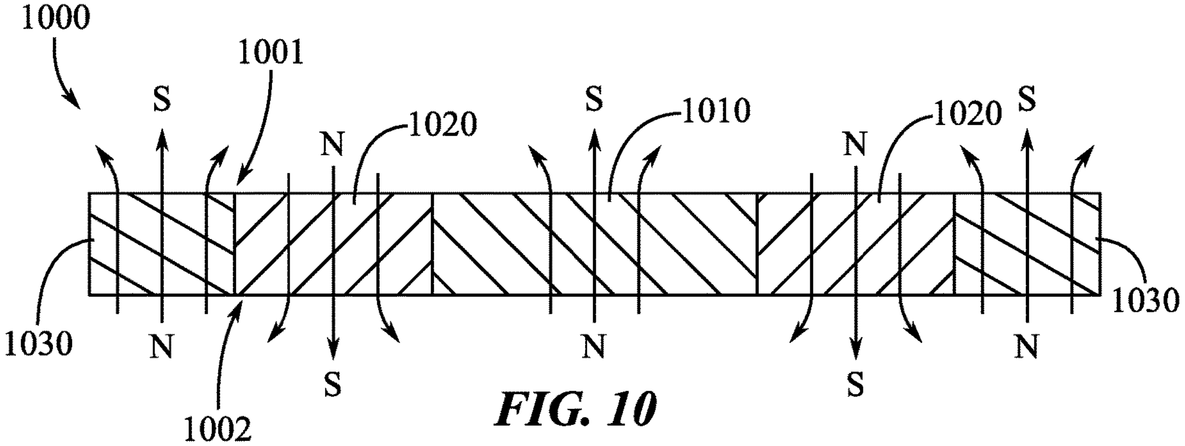
FIG. 10 (PRIOR ART)
FIG. 10 shows a cross-sectional view of a prior art magnetic component.

FIG. 10 shows a cross-sectional view of a prior art magnetic component 1000 including an arrangement of portions 1010, 1020, and 1030 having alternating magnetic polarities. The magnetic component 1000 shown can have the same shape and/or polar configuration as the magnetic component 900 shown in FIGS. 9A and 9B, although the prior art magnetic component 1000 can be formed from different materials and is magnetized according to conventional magnetization processes.

As can be seen, each of the portions 1010, 1020, 1030 of the magnetic component 1000 generates a magnetic field (indicated with reference arrows) that bends towards the opposite pole of an adjacent portion and passes through both the top surface 1001 and the bottom surface 1002 of the component 1000 as defined by the portions 1010, 1020, 1030. Such a magnetic field configuration is often not desirable for some applications, such as those described herein, because half of the flux of the field, and thus half of the potential force exerted by the magnetic field, passes through the bottom surface 10002 of the component 1000. In some situations, for example when using two magnetic components to couple to one another, as shown in FIG. 9B, this portion of the field passing through the bottom surface 1002 does not contribute to the attractive force of the magnetic components, and thus, the components cannot exert as high of an attractive force on one another as desired. Conventional techniques for solving this problem can include positioning a shunt adjacent to the bottom surface 1002 that can manipulate the field so that more flux passes through the top surface 1001 and not the bottom surface 1002. Such a shunt is conventionally formed of ferrous metal, however, and can thus result in an undesirable increase in the weight and thickness of the magnetic component 1000, and can further result in an inflexible, or less flexible than desired, magnetic component 1000. Such a magnetic component 1000, can be undesirable for use in a wearable device or with components for a wearable device as described herein.

Figure 11:
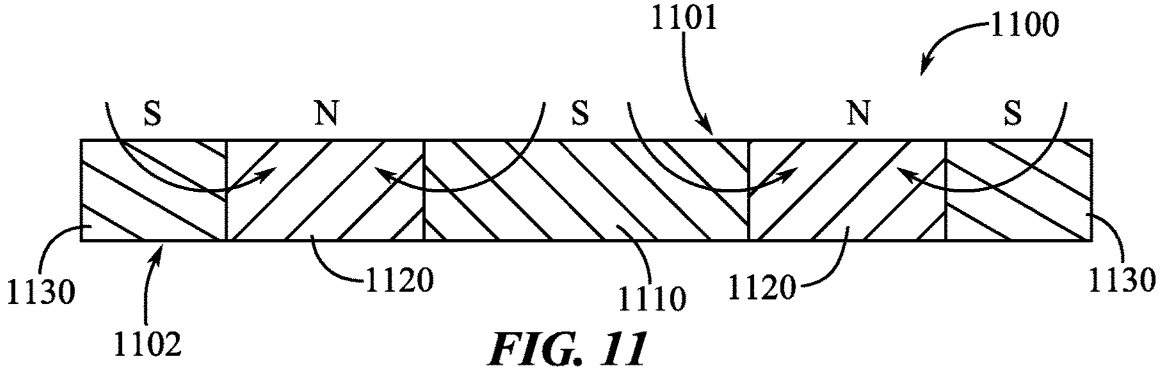
FIG. 11 shows a cross-sectional view of a magnetic component.

In contrast to FIG. 10, FIG. 11 shows a cross-sectional view of a magnetic component 1100 that can be substantially similar to the magnetic component 900 described with respect to FIGS. 9A and 9B. The magnetic component 1100 can include some or all of the features of any of the magnetic components described herein, and can be formed from the materials described with respect to magnetic component 800 of FIG. 8, such as a magnetizable powder and a flexible polymer binder. Further, the magnetic component 1100 can be magnetized according to a process described herein.

As can be seen, each of the portions 1110, 1120, 1130 of the magnetic component 1100 generates a magnetic field (indicated with reference arrows) that bends towards the opposite pole of an adjacent portion. In the present example, however, the flux does not pass through a bottom surface 1102 of the magnetic component and only, or substantially predominantly, passes through the top surface 1101 of the magnetic component 1100 defined by the portions 1110, 1120, 1130. Accordingly, the composition, magnetization, and arrangement of the magnetic component 1100 can achieve a similar or even greater magnetic flux through the surface 1101, and thus a similar or even greater force as the magnetic component 1000 of FIG. 10, without the need for additional material or components such as a shunt. In some examples, the magnetic component 1100 can exert a greater magnetic force or field strength than the component 1000, even though the magnetic component 1100 can be thinner or include less material. Accordingly, the flexible magnetic component 1100 can be included in a wearable device or component, such as a securing component for a wearable device, without reducing the flexibility of the device or component or undesirably increasing the weight or thickness of the device or component, as described herein.

In some examples, the strength of the magnetic field measured adjacent to the top surface 1101 can be greater than a strength of the magnetic field measured adjacent to a second, opposite surface 1102. For example, the composition, magnetization, and arrangement of the magnetic component 1100 can allow for the magnetic field strength near the top surface 1101 to be much larger than the magnetic field strength near the bottom surface 1102. In some examples, the magnetic field strength measured near or adjacent to the top surface 1101 can be greater than about 1000 Gauss (Gs), greater than about 1250 Gs, greater than about 1500 Gs, greater than about 1750 Gs, or even up to about 2000 Gs or greater. In some examples, the magnetic field strength measured near or adjacent to the bottom surface 1102 can be less than 1000 Gs, less than 500 Gs, less than 400 Gs, or even less than 350 Gs or smaller. Thus, in some examples, a ratio of the magnetic field strength measured near or adjacent to the top surface 1101 to the magnetic field strength measured near or adjacent to the bottom surface 1102 can be greater than 1.5, greater than 2, greater than 3, greater than 4, greater than 4.5, 4.6, 4.7, 4.8, or even 4.9 or more.

Further, the arrangement of polarities and the flux of the magnetic field generated by the portions 1110, 1120, 1130 of the magnetic component 1100 can be less prone to self-demagnetization than the magnetic component 1000 described with respect to FIG. 10. This can be at least partially due to the fact that the distance between corresponding poles is increased in magnetic component 1100 compared to magnetic component 1000. Whereas the distance between corresponding poles (N and S) in magnetic component 1000 is the vertical thickness of the component 1000, the distance between corresponding poles (N and S) of magnetic component 1100 is dictated by the width of the portions 1110, 1120, 1130, and can be much larger than the distance of component 1000, even with a similarly thin or thinner magnetic component. Various examples of components, accessories, and electronic devices including the one or more magnetic components as described herein, as well as processes for magnetizing and forming magnetic components are described below with reference to FIGS. 12-13.

Figure 12:
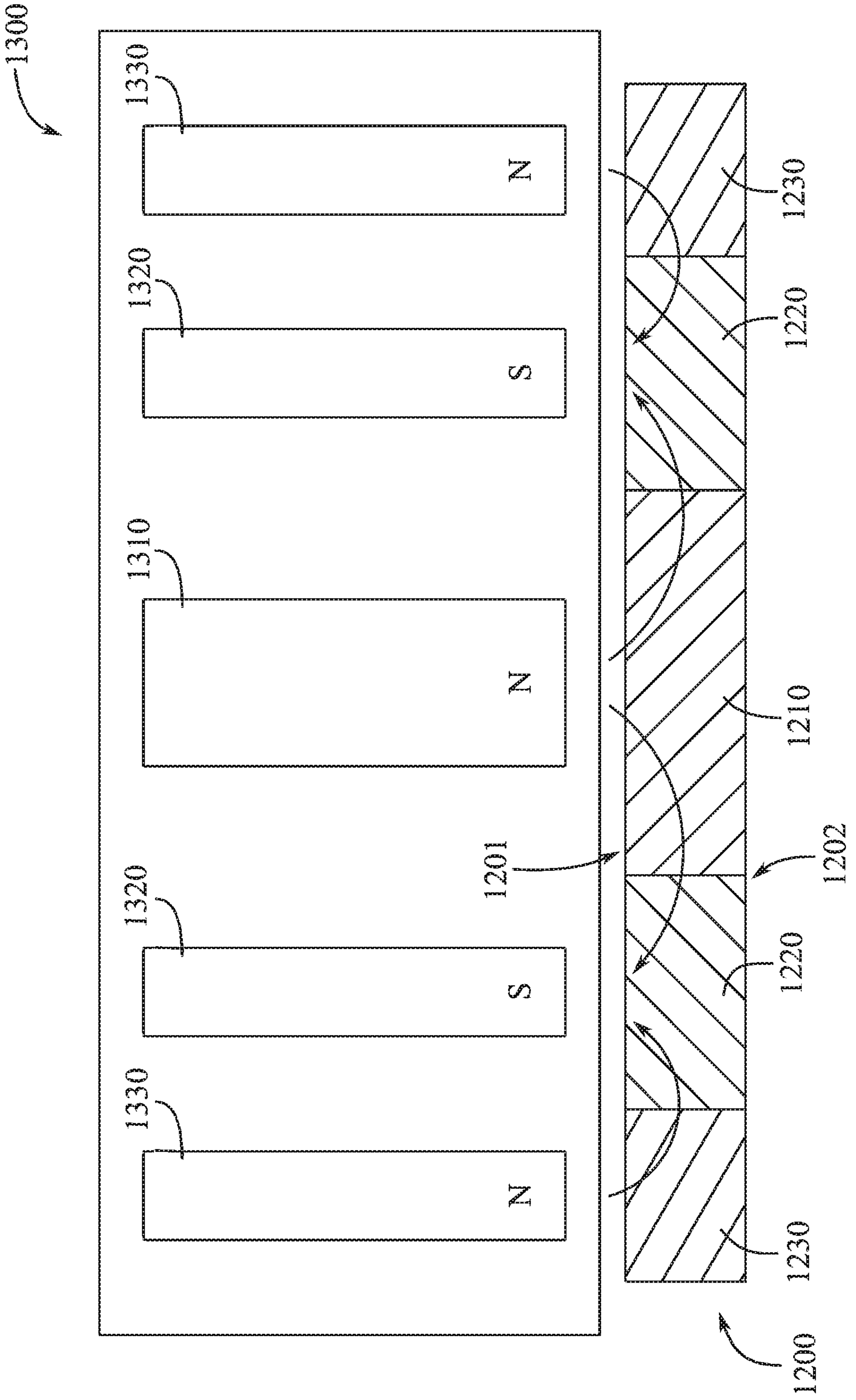
FIG. 12 shows a cross-sectional view of a magnetic component and a magnetizer.

FIG. 12 illustrates a cross-sectional view of an example of a magnetic component 1200 and a magnetizing apparatus 1300, otherwise referred to as a magnetizer 1300. The magnetic component 1200 can be substantially similar to, and can include some or all of the features of the magnetic components described herein, such as magnetic components 800, 900, and 1100 described with respect to FIGS. 8, 9A, 9B, and 11. In some examples, the magnetic component 1200 can include a magnetizable powder and a flexible polymer binder.

The magnetic component 1200 can be formed into a desired shape, such as the shape of magnetic component 900 illustrated in FIGS. 9A and 9B by any desired process or method as described herein, including molding. In some examples, the magnetic component 1200 can be molded or formed into a desired shape before the magnetizable powder is magnetized, and thus prior to its production of a magnetic field or a desired magnetic field. In some examples, in order to magnetize the magnetic component 1200 to a desired level, the magnetizer 1300 can be brought into close proximity, for example adjacent to, or substantially adjacent to, a side of the magnetic component 1200, and can be powered on to generate a magnetic field that is stronger than the coercivity of the magnetizable material of the magnetic component 1200 and that saturates the entire thickness of the magnetic component 1200.

The magnetizer can include multiple electromagnets 1310, 1320, 1330, for example, sized and shaped to correspond to the desired portions 1210, 1220, 1230 having alternating polarities to be formed in the magnetic component 1200. For example, where the portion 1220 is a circular or disk-shaped portion, the corresponding electromagnet 1320 can also be circular or disk shaped. The magnetic fields produced by the electromagnets 1310, 1320, 1330 of the magnetizer 1300 can have polarities that are opposite of the desired polarities of the desired portions 1210, 1220, 1230. Further, because the magnetizer 1300 predominantly or exclusively exposes the magnetic component 1200 to magnetic fields from one side, namely through the surface 1201 thereof, the one-sided magnetic polarity described with respect to FIG. 11 can be induced in the magnetic component 1200. In contrast, conventional magnetizers expose magnetic components to magnetic fields from two sides, for example from top surface 1201 and bottom surface 1202 of the magnetic component, and can result in the configuration of magnetized component 1000 shown in FIG. 10.

In some examples, the magnetizer 1300 can expose the magnetic component 1200 to a magnetic field of about 1 Tesla (T) or greater. In some examples, the magnetizer 1300 can expose the magnetic component 1200 to a magnetic field of about 2 T or greater. During the magnetization process, the current used by the magnetizer 1300 to generate the magnetic fields can be monitored to ensure that saturation of the magnetic component 1200 has occurred. In some examples, once the current used to generate the fields has plateaued, then saturation of the magnetic component 1200 can be deemed to have occurred. In some examples, it can be difficult for the magnetizer 1300 to generate a strong enough field to saturate the entire thickness of the magnetic component 1200. In these examples, additional components, such as additional magnetizers, magnets, or other components for directing or generating magnetic fields can be used to ensure a magnetic field of the desired polarity completely saturates the entire thickness of the material of the magnetic component 1200.

Figure 13:
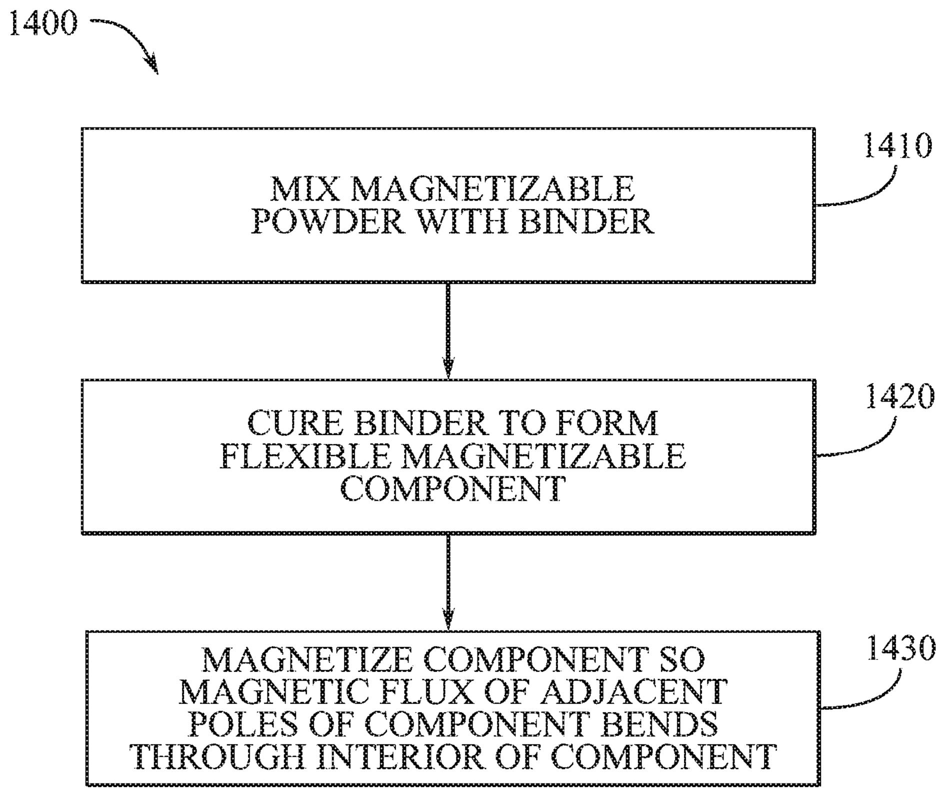
FIG. 13 shows a process flow diagram for a process of forming a magnetic component.

FIG. 13 shows a process flow diagram for a method 1400 of forming a magnetic component including a magnetizable powder and a flexible binder material, as described herein. The magnetic component can include some or all of the features of any of the magnetic components described herein, such as magnetic component 800, 900, 1100, and 1200. The method 1400 can include mixing a magnetizable powder with a binder material at block 1410, curing the binder material to form a flexible component at block 1420, and magnetizing the flexible component at block 1430 so that the magnetic flux from alternating magnetic poles of adjacent portions of the flexible component pass entirely or predominantly laterally through the interior of the component and through a first surface thereof, and do not pass, or do not significantly pass through a second surface opposite the first surface.

At block 1410, a magnetizable powder can be mixed with a binder material, for example in a molten, melted, and/or liquid state. In some examples, the magnetizable powder can include a rare earth element, as described herein. In some examples, the magnetizable powder can include neodymium and can be NdFeB. The binder material can be a polymeric material that can have a desired level of resiliency, weight, flexibility, or other material properties when in a cured or otherwise solid state. In some examples, the magnetizable powder can be mixed with the binder material when the binder material is in a liquid state. In some other examples, the magnetizable powder can be mixed with a solid binder material, such as in powdered form, that can then be melted to a liquid state.

At block 1420, the mixed magnetizable powder and binder material can be cured, for example in a desired shape, to form a flexible component having the material properties described herein. In some examples, the mixed magnetizable powder and binder material can be provided into a mold in a liquid and/or melted form, and can be cooled and/or cured to form a solid flexible component. In some examples, the magnetizable powder and binder material can be solidified by cooling from a heated or melted state. In some other examples, the magnetizable powder and binder material can be cured to a solid state, such as through exposure to electromagnetic radiation and/or one or more chemicals to facilitate the curing process, depending on the binder materials. As described herein, in some examples, a magnetic field can be applied to the magnetizable powder and binder mixture during the cooling or curing process to provide a partially isotropic magnetizable flexible component. For example, the flexible component can be isotropically magnetized in two spatial dimensions, and can be anisotropically magnetized in a third spatial dimension after undergoing such a process.

In some examples, the curing or solidifying process can be a molding process, such as an injection molding or compression molding process. In some examples, any process capable of forming the mixture or combination of magnetizable powder and binder into a continuous or unitary solid flexible component can be carried out at block 1420.

At block 1430, the flexible component can be magnetized so that the entire magnetic flux from one set of alternating magnetic poles of adjacent portions of the flexible component passes predominantly through the interior of the flexible component and a first exterior surface of the flexible component, and not through a second exterior surface opposite the first exterior surface. The magnetization process of block 1430 can be similar to, and can include some or all of the features and/or steps of the magnetization process including magnetizer 1300 described with respect to FIG. 12. Accordingly, the magnetization process of block 1430 can form a magnetized flexible magnetic component having some or all of the features of the magnetic components described herein, including high magnetic field strength and desired levels of lightness, flexibility, and resilience. The method 1400 can include additional treatment or processing steps, including further forming processes, such as machining or milling of the flexible magnetic component, as well as processes such as forming a component including the flexible magnetic component.

Any of the features or aspects of the magnetic components discussed herein can be combined or included in any varied combination. For example, the design and shape of the magnetic components described herein are not limited in any way, and can be formed by any number of processes, including those discussed herein. Further, a magnetic component can include any number, size, and configuration of portions having alternating magnetic polarities and can be combined with one or more other components by any method now known or discovered in the future. The principles and structure described with respect to the magnetic components can also be used in conjunction with other devices and assemblies including the magnetic components and are not limited to being applicable to electronic devices or components.

To the extent applicable to the present technology, gathering and use of data available from various sources can be used to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, TWITTER® ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates examples in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

As used herein, the terms exterior, outer, interior, inner, top, and bottom are used for reference purposes only. An exterior or outer portion of a component can form a portion of an exterior surface of the component but may not necessarily form the entire exterior of outer surface thereof. Similarly, the interior or inner portion of a component can form or define an interior or inner portion of the component but can also form or define a portion of an exterior or outer surface of the component. A top portion of a component can be located above a bottom portion in some orientations of the component, but can also be located in line with, below, or in other spatial relationships with the bottom portion depending on the orientation of the component.

Various inventions have been described herein with reference to certain specific embodiments and examples. However, they will be recognized by those skilled in the art that many variations are possible without departing from the scope and spirit of the inventions disclosed herein, in that those inventions set forth in the claims below are intended to cover all variations and modifications of the inventions disclosed without departing from the spirit of the inventions. The terms "including:" and "having" come as used in the specification and claims shall have the same meaning as the term "comprising."

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A flexible magnetic component, comprising:

a magnetizable powder comprising a rare earth element; and a polymer binder;

wherein the flexible magnetic component has a first magnetic field strength adjacent to a first surface of the flexible magnetic component at least 3 times greater than a second magnetic field strength adjacent to a second surface of the flexible magnetic component opposite the first surface, the flexible magnetic component having a thickness of less than 0.3 millimeters and an attractive force per volume of greater than 20 $N/cm^3$ when disposed directly adjacent a substantially identical magnetic component.

2. The flexible magnetic component of claim 1, wherein the first magnetic field strength is at least 4 times greater than the second magnetic field strength.

3. The flexible magnetic component of claim 1, wherein the flexible magnetic component can elongate greater than 20% without plastic deformation.

4. The flexible magnetic component of claim 1, wherein the polymer binder comprises at least one of a nitrile butadiene rubber material, a silicone material, or a fluoroelastomer material.

5. The flexible magnetic component of claim 1, wherein the magnetizable powder comprises neodymium.

6. The flexible magnetic component of claim 1, wherein the flexible magnetic component has a density of between 5 grams per cubic centimeter ($g/cm^3$) and 6.5 $g/cm^3$.

7. The flexible magnetic component of claim 1, further comprising:

a first portion having a first magnetic polarity;

a second portion disposed adjacent to the first portion, the second portion having a magnetic polarity that is opposite the first magnetic polarity; and a third portion disposed adjacent to the first portion opposite the second portion, the third portion having a magnetic polarity that is opposite the first magnetic polarity.

8. The flexible magnetic component of claim 7, wherein an entire amount of magnetic flux from a magnetic pole of the first portion to a magnetic pole of the second portion or the third portion passes predominantly through an interior of the flexible magnetic component and a single exterior surface defined by the first portion.

9. A flexible magnetic component, comprising:

a body defining a first surface and a second surface opposite the first surface, wherein:

a first magnetic field strength adjacent to the first surface is at least 3 times greater than a second magnetic field strength adjacent to the second surface, the first magnetic field strength being at least 1000 Gauss; and the body experiences no permanent deformation upon being elongated more than 20%.

10. The flexible magnetic component of claim 9, further comprising:

a first portion having a first magnetic polarity;

a second portion surrounding the first portion, the second portion having a magnetic polarity opposite the first magnetic polarity; and a third portion surrounding the second portion, the third portion having the first magnetic polarity.

11. The flexible magnetic component of claim 9, wherein the flexible magnetic component has a thickness of less than 0.3 millimeters.

12. The flexible magnetic component of claim 9, wherein the flexible magnetic component is isotropically magnetized.

13. The flexible magnetic component of claim 9, wherein the flexible magnetic component is isotropically magnetized in two spatial dimensions and anisotropically magnetized in a third spatial dimension.

14. The flexible magnetic component of claim 9, wherein the body comprises a magnetizable powder comprising between 55 vol % and 75 vol % of the flexible magnetic component.

15. A securing system for a device, comprising:

a device enclosure comprising a magnetic material; and a component comprising a flexible magnetic portion that is attracted to the magnetic material of the device enclosure, wherein:

the flexible magnetic portion defines a first surface and a second surface opposite the first surface;

a first magnetic field strength adjacent to the first surface is at least 3 times greater than a second magnetic field strength adjacent to the second surface, the first magnetic field strength capable of resisting a shear force per volume of greater than 10 $N/cm^3$ when disposed approximately 0.8 mm from a substantially identical magnetic component; and the flexible magnetic portion having a thickness of less than 0.3 millimeters.

16. The securing system of claim 15, wherein the flexible magnetic portion comprises:

a magnetizable powder including a rare earth element; and a polymer binder.

17. The securing system of claim 15, wherein the magnetic material comprises a sintered magnet.

18. The securing system of claim 15, wherein:

the device enclosure comprises a watch housing; and the component comprises a watch band.

19. The securing system of claim 18, wherein:

the flexible magnetic portion comprises a first flexible magnetic portion; and the component comprises a second flexible magnetic portion having a magnetic polarity opposite the magnetic polarity of the first flexible magnetic portion.

20. The securing system of claim 15, wherein:

the device enclosure comprises an electronic device enclosure including a transparent portion overlying a display; and the component comprises a cover for the transparent portion.

* * * * *